(12) United States Patent
Fujiwara et al.

(10) Patent No.: US 9,550,513 B2
(45) Date of Patent: Jan. 24, 2017

(54) STEERING COLUMN SUPPORT CONSTRUCTION

(75) Inventors: Takeshi Fujiwara, Gunma (JP); Toru Segawa, Gunma (JP); Takahiro Minamigata, Gunma (JP); Kiyoshi Sadakata, Gunma (JP)

(73) Assignee: NSK LTD., Tokyo (JP)

( * ) Notice: Subject to any disclaimer, the term of this patent is extended or adjusted under 35 U.S.C. 154(b) by 247 days.

(21) Appl. No.: 14/234,751

(22) PCT Filed: Jul. 25, 2012

(86) PCT No.: PCT/JP2012/068890
§ 371 (c)(1),
(2), (4) Date: Mar. 14, 2014

(87) PCT Pub. No.: WO2013/015339
PCT Pub. Date: Jan. 31, 2013

(65) Prior Publication Data
US 2014/0197293 A1    Jul. 17, 2014

(30) Foreign Application Priority Data

Jul. 26, 2011 (JP) ............................ 2011-163415
Sep. 20, 2011 (JP) ............................ 2011-204454

(51) Int. Cl.
*B62D 1/18* (2006.01)
*B62D 1/187* (2006.01)
(Continued)

(52) U.S. Cl.
CPC .............. *B62D 1/18* (2013.01); *B60R 25/021* (2013.01); *B60R 25/023* (2013.01); *B62D 1/184* (2013.01); *B62D 1/187* (2013.01); *B62D 1/195* (2013.01)

(58) Field of Classification Search
CPC ........... B62D 1/18; B62D 1/195; B62D 1/184; B62D 1/187; B60R 25/021; B60R 25/023
See application file for complete search history.

(56) References Cited

U.S. PATENT DOCUMENTS 7,699,344 B2 * 4/2010 Moriyama ............. B62D 1/184
280/775
8,678,436 B2 * 3/2014 Duffy .................... B62D 1/195
280/777
(Continued)

FOREIGN PATENT DOCUMENTS

JP    51-121929    10/1976
JP    2000-053003    2/2000
(Continued)

OTHER PUBLICATIONS

International Search Report and Written Opinion dated Oct. 30, 2012 from the corresponding PCT/JP2012/068890.
(Continued)

*Primary Examiner* — Faye M Fleming
(74) *Attorney, Agent, or Firm* — Katten Muchin Rosenman LLP

(57) ABSTRACT

Provided is steering column support construction that together with eliminating strong rubbing between the bottom surface of a vehicle-side bracket 23a and the top surface of a column-side bracket 22a, and keeping the absolute value and fluctuation in the break away load small, more completely protects the driver during a collision accident without lowering the freedom of design of the steering apparatus. An adjustment rod 27 for adjusting the position of a steering wheel is provided on the top side of a steering column 6b. During a secondary collision, a moment that is applied to the column-side bracket 22a is kept small, friction at the area of rubbing between the column-side bracket 22a and the vehicle-side bracket 23a is reduced, and the break away load
(Continued)

is kept low. Moreover, the driver's knees are protected by eliminating the portion that protrudes further downward than the steering column 6b.

11 Claims, 16 Drawing Sheets

(51) Int. Cl.
*B62D 1/184* (2006.01)
*B62D 1/19* (2006.01)
*B60R 25/021* (2013.01)
*B60R 25/023* (2013.01)

(56) References Cited

U.S. PATENT DOCUMENTS

| | | | |
|---|---|---|---|
| 8,746,740 B2* | 6/2014 | Tanaka | B62D 1/184 280/771 |
| 2008/0236326 A1* | 10/2008 | Matsui | F16F 7/123 74/493 |
| 2012/0291585 A1* | 11/2012 | Minamigata | B62D 1/195 74/493 |
| 2014/0137693 A1* | 5/2014 | Buzzard | B62D 1/184 74/493 |

FOREIGN PATENT DOCUMENTS

| | | |
|---|---|---|
| JP | 2008-024164 | 2/2008 |
| WO | 2007009734 | 1/2007 |
| WO | 2007/097340 | 8/2007 |
| WO | 2010/026552 A2 | 3/2010 |

OTHER PUBLICATIONS

Microfilm of the specification and drawings annexed to the request of Japanese Utility Model Application No. 41869/1975 (Laid-open No. 121929/1976) (Nissan Motor Co., Ltd.), Oct. 2, 1976.
Extended European Search Report, dated Apr. 2, 2016 for the Corresponding European Patent Application No. 12817979.3.
Chinese Office Action, dated Apr. 1, 2016 for the Corresponding Chinese Patent Application No. 201280000772.4.

* cited by examiner

STEERING COLUMN SUPPORT CONSTRUCTION

TECHNICAL FIELD

The present invention relates to construction in a steering apparatus for an automobile for supporting a steering column that supports a steering wheel by the vehicle body so that the steering column is able to displace in the forward direction while absorbing impact energy that is applied to the steering wheel from the body of the driver during a collision accident.

BACKGROUND ART

As illustrated in FIG. 15, a steering apparatus for an automobile is constructed so that rotation of the steering wheel 1 is transmitted to an input shaft 3 of a steering gear unit 2, and as the input shaft 3 rotates, that rotation pushes or pulls a pair of left and right tie rods 4, which apply a steering angle to the front wheels, which are the steered wheels. More specifically, the steering wheel 1 is supported by and fastened to the rear end section of a steering shaft 5, and the steering shaft 5, being inserted in the axial direction through the steering column 6, is supported by the steering column 6 so as to be able to rotate freely. Moreover, the front end section of the steering shaft 5 is connected to the rear end section of an intermediate shaft 8 by way of a universal joint 7, and the front end of the intermediate shaft 8 is connected to the input shaft 3 by way of a separate universal joint 9.

A tilt and telescopic type steering apparatus, wherein it is possible to adjust the forward-backward position and the up-down position of the steering wheel 1, is widely used as a steering apparatus. The following kind of construction is employed in order to achieve this kind of tilt and telescopic mechanism. First, the steering shaft 5 is constructed by combining an inner shaft 12 and an outer shaft 13 such that rotation force can be transmitted, and so that relative displacement in the axial direction is possible, and the forward-backward position of the steering wheel 1 can be adjusted by relative displacement in the axial direction between the inner shaft 12 and outer shaft 13.

The steering column 6 is constructed such that the portion on the front end side of an outer column 11 fits around the portion on the rear end side of an inner column 10 such that relative displacement in the axial direction is possible, where the forward-backward position of the steering wheel 1 can be adjusted by this relative displacement in the axial direction. Moreover, of the steering column 6, the inner column 10 that is located on the front side is supported by part of the vehicle body by way of a housing 14, which together with housing a reduction gear and the like of an electric power-steering apparatus, and to which an electric motor 15 that is an auxiliary power source for the electric power-steering apparatus, and a controller 16 for controlling power to the electric motor 15 is supported and fastened. In order to achieve the tilt mechanism, a support cylinder 17 is provided in the left-right direction on the front end of the top section of the housing 14, and a horizontal shaft 18 such as a bolt that is inserted through this support cylinder 17 supports the front end section of the steering column 6 by way of the vehicle body so that the rear section of the steering column 6 can pivotally displace in the up or down direction.

In order to make it possible to adjust the tilt position and the telescopic position of the steering wheel 1, the outer column 11 is supported by a column-side bracket 22 so as to be able to move in the forward-backward direction and up-down direction. In order for this, as illustrated in FIG. 16, a slit 19 is formed in the bottom surface of the front half section of the outer column 11 so that the inner diameter of this front half section of the outer column 11 can elastically expand or contract. Furthermore, a pair of thick plate shaped supported plate sections 21 are provided in the portions on both sides in the width direction of the slit 19. These supported plate sections 21 displace together with the outer column 11 when adjusting the position of the steering wheel 1, and function as a displacement-side bracket.

In a state where the steering wheel 1 is held in the adjusted position, the supported plate sections 21 are firmly held between a pair of left and right support plate sections 24 of the column-side bracket 22. Long holes 25 in the up-down direction that have an arc shape that is centered about the horizontal shaft 18 are formed in the support plate sections 24, and long holes 26 in the forward-backward direction that extend in the axial direction of the outer column 11 are formed in the supported plate sections 21. An adjustment rod 27 is inserted through the long holes 25 in the up-down direction and the long holes 26 in the forward-backward direction. A head section 28 that is formed on the base end section (right end section in FIG. 16) of the adjustment rod 27 engages with one of the long holes 25 in the up-down direction that are formed in one of the support plate sections 24 (right side in FIG. 16) so that rotation is prevented and only displacement along this long holes 25 is possible. On the other hand, a nut 29 is screwed onto the tip end section (left end section in FIG. 16) of the adjustment rod 27. This nut 29 can be rotated and driven by an adjustment lever 33.

When adjusting the position of the steering wheel 1, by rotating the adjustment lever 33 in a specified direction (downward), the nut 29 is rotated and driven, which expands the space between the head section 28 and the nut 29 and releases the force by which the support plate sections 24 hold the supported plate sections 21. At the same time, the inner diameter of the portion on the front section of the outer column 11 into which the rear section of the inner column 10 is fitted is elastically expanded, and the surface pressure that acts on the area of contact between the inner circumferential surface of the front section of the outer column 11 and the outer circumferential surface of the rear section of the inner column 10 is reduced. In this state, it is possible to adjust the up-down position and the forward-backward position of the steering wheel 1 within the range that the adjustment rod 27 is able to displace inside the long holes 25 in the up-down direction and the long holes 26 in the forward-backward direction.

After the steering wheel 1 has been moved to a desired position, by rotating the adjustment lever 33 in the opposite direction (upward) from the specified direction, the space between the head section 28 and the nut 29 contracts, and the support plate sections 24 firmly hold the supported plate sections 21. At the same time, the inner diameter of the portion on the front section of the outer column 11 into which the rear section of the inner column 10 is fitted elastically contracts, causing the surface pressure that acts at the area of contact between the inner circumferential surface of the front end of the outer column 11 and the outer circumferential surface of the rear section of the inner column to increase. In this state, the up-down position and the forward-backward position of the steering wheel 1 is maintained in the adjusted position.

On the other hand, in this kind of steering apparatus for an automobile, in order to protect the driver during a collision accident, construction is necessary that allows the steering wheel 1 to displace in the forward direction while absorbing the impact energy. In other words, during a collision accident, after a primary collision in which an automobile collides with another automobile, a secondary collision occurs in which the body of the driver collides with the steering wheel 1. During this secondary collision, in order to protect the driver by lessening the impact that is applied to the body of the driver, construction is widely employed in which the steering column 6 that supports the steering wheel 1 is supported by the vehicle body so as to be able to break away in the forward direction due to an impact load in the forward direction caused by the secondary collision.

In order for this, as illustrated in FIG. 16, a pair of top plates 43 are provided on the top end sections of the pair of left and right support plate sections 24 of the column-side bracket 22 so as to protrude on the sides of the steering column 6, and locking notches 34 are provided in these top plate sections 43 so as to be open on the edge on rear end of the top plate sections 43. Locking capsules 36 that are fastened to the vehicle body by bolts (not illustrated in the figure) lock in these locking notches 34. In each of the locking capsules 36, engagement grooves 66 for engaging with the edge sections on the left and right sides of the locking notches 34 are formed on surfaces of the left and right side thereof, and a through hole 67 in the up-down direction through which a bolt (not illustrated in the figure) is inserted is formed in the middle sections thereof.

During a collision accident, a large impact load in the forward direction is applied from the driver's body to the steering column 6 by way of the steering wheel 1 and steering shaft 5. This causes a tendency for the steering shaft 5 and steering column 6 to contract along the entire length while absorbing the impact energy. As a result, as the column-side bracket tends to displace in the forward direction together with the outer column 11, the locking capsules 36 remain in position together with the bolts. Consequently, these locking capsules 36 come out toward the rear from the locking notches 34, which allows the steering wheel 1 to displace in the forward direction.

In this kind of conventional construction, the column-side bracket 22 is supported by the vehicle body so as to be able to break away in the forward direction during a secondary collision at two locations on the left and right sides. Therefore, from the aspect of the allowing stable forward displacement of the steering wheel 1 without tilting with respect to the axial direction during a secondary collision, simultaneous disengagement of the pair of left and right locking capsules 36 from the locking notches 34 very important. However, performing tuning in order for simultaneous release of the left and right engaged states requires much time and work because it is affected by resistance such as friction resistance and shear resistance against the release of the engagement of these members, and left and right unbalance in the inertial mass of the portions that displace in the forward direction together with the steering column 6.

In order to stabilize the break away of the steering column in the forward direction during a secondary collision, preferably, as disclosed in JPS 51-121929 (U), the steering column 6 is supported by the vehicle in the center section in the width direction so as to be able to break away. In other words, by using construction wherein the steering column 6 is supported at the center section in the width direction as disclosed in JPS 51-121929 (U) instead of using construction wherein the steering column 6 is supported at two locations in the width direction as illustrated in FIG. 16, it becomes difficult for the steering column 6 to tilt when breaking away in the forward direction, and thus it becomes easier to perform tuning in order to protect the driver. Therefore, even in the conventional construction illustrated in FIG. 16, it is necessary to devise construction that supports the steering column 6 in the center section in the width direction, however, that does not mean that the construction disclosed in JPS 51-121929 (U) can be applied right away as it is.

In the conventional construction illustrated in FIG. 16, as a secondary collision proceeds, there is a possibility that the locking capsules 36 will come all the way out from the locking grooves 34. In that case, support of the outer column 11 by the column-side bracket 22 is lost, and there is a possibility that the steering wheel 1 will drop excessively. In such a situation, operation of the steering wheel 1 becomes difficult.

RELATED LITERATURE

Patent Literature

[Patent Literature 1] JPS 51-121929 (U)

SUMMARY OF INVENTION

Problem to be Solved by Invention

In this way, in a steering apparatus that comprises a tilt mechanism and/or a telescopic mechanism, and particularly in a steering apparatus having construction wherein the steering column supports a heavy electric power steering apparatus, construction is needed in which the steering column is supported so that it is able to break away stably in the forward direction during a secondary collision, and is able to more completely protect the driver. The present invention is the result of knowledge obtained by the inventors diligently studying conventional construction of a steering apparatus wherein the steering column is supported by the vehicle body. The object of the present invention is to achieve construction for supporting a steering column that simultaneously (1) simplifies tuning for allowing the steering wheel to displace stably in the forward direction during a secondary collision; (2) prevents strong rubbing between the bottom surface of the vehicle-side bracket and the top surface of the column-side bracket, and keeps the absolute value and fluctuation in the break away load small; and (3) completely protects the driver during a collision accident without a reduction in the freedom of design of the steering apparatus. Furthermore, another object of the present invention is to (4) achieve construction that improves the operability when adjusting the position of the steering wheel.

Means for Solving Problems

The present invention relates to support construction for a steering column, or in other words, relates to construction for supporting a steering column for supporting a steering shaft that supports a steering wheel with respect to the vehicle body so as to be able to rotate freely. The steering column support construction, comprises:

a displacement-side bracket that is fastened to a top side portion of the middle section of a steering column;

a vehicle-side bracket that has a locking section with material removed that is formed in the middle section in the width direction thereof, and that is fastened to the vehicle body side in at least two locations on both sides in the width direction of the locking section with material removed;

a column-side bracket having a pair of left and right support plate sections that are located on both sides of the displacement-side bracket;

a locking member that together with being fastened to the column-side bracket, engages with the locking section with material removed;

an adjustment rod that, with the displacement-side bracket held between the support plate sections, is inserted in the width direction through the displacement side bracket and is spanned between the support plate sections; and a pair of pressure sections that are provided on both end sections of the adjustment rod; wherein by expanding or contracting the space between the pressure sections, it is possible to fasten the position or adjust the position of the displacement-bracket with respect to the column-side bracket, and the column-side bracket and locking member are supported with respect to the vehicle-side bracket so as to be able to break away in the forward direction.

Preferably, when seen from the width direction, the edges on the bottom ends of the support plate sections of the column-side bracket do not protrude downward from the portion on the bottom side of the middle section of the steering column.

In one embodiment of the present invention, the locking section with material removed is composed of a locking notch or through hole that extends in the forward-backward direction and that is formed in the center section in the width direction of the vehicle-side bracket, and the locking member is composed of a locking capsule that is fastened to the column-side bracket.

In this case, it is possible to employ construction wherein the column-side bracket comprises a top plate section that connects the edges on the top ends of the support plate sections, and the locking capsule, together with comprising a flange section on both end sections in the width direction, is supported by and fastened to the top surface of the top plate section, and the edge portions on both sides of the locking notch or the through holes of the vehicle-side bracket are locked between the bottom surface of the flange section and the top surface of the top plate section.

In another embodiment of the present invention, the locking section with material removed is composed of a locking notch or a through hole that extends in the forward-backward direction; the locking member is composed of a bolt comprising a head section that is located on the top end section and has a diameter that is larger than the width dimension of the locking notch or through hole, and a male screw section that is provided on the bottom end section; and the column-side bracket comprises a top plate section that connects the edges on the top ends of the support plate sections; and by the male screw section of the bolt screwing into a nut that is fastened to the top plate section or into a screw hole that is formed in the top plate section and tightened, the edge portions on both sides of the locking notch or through hole of the vehicle-side bracket is locked between the bottom surface of the head section of the bolt and the top surface of the top plate section.

In this case, preferably, the steering column support construction further comprises a sliding member that comprises a pair of top and bottom sliding plates, and a connecting section that has a width dimension that is less than the width dimension of the locking section with material removed and that is integrally connected with the sliding plates, wherein the sliding plates are respectively held between the bottom surface of the head section and the top surface of the vehicle-side bracket, and between the bottom surface of the vehicle-side bracket and the top surface of the top plate sections.

Furthermore, preferably, the locking section with material removed is composed of a through hole that comprises a wide section in the front half section, and two extending sections in the rear half section that are notches and extend further backward from two location on both end sections in the width direction of the rear end edge of the wide section, and parallel with each other in the forward-backward direction, and the sliding member and the bolts are located in the rear end sections of these extending sections.

Alternatively, the locking section with material removed is composed of a pair of through holes that extend in the forward-backward direction and parallel with each other, and the sliding member and the bolts are located in the rear end sections of these extending sections.

In construction comprising these pair of sliding members, preferably a reinforcement plate is provided on the top side of the sliding members that are located at the rear end sections of the extending sections or the through holes so as to be spanned between the sliding members, and the top surfaces of both end sections of the reinforcement plate are pressed against the top surface of the vehicle-side bracket by the bottom surface of the head sections of the bolts.

Moreover, in the steering column support construction of the present invention, preferably, a portion of at least one of the support plate sections where the adjustment rod is inserted has rigidity in the width direction that is lower than the other portions.

Therefore, a slit is formed in a portion adjacent to the through hole that is formed in the at least one of the support plate sections for inserting the adjustment rod.

Alternatively, a portion where the through hole is formed for inserting the adjacent rod in the at least one of the support plate sections protrudes in the forward-backward direction from the connecting section between the column-side bracket with the locking member and the vehicle-side bracket, and the edge on the top end of this protruding portion is not connected to the top plate section.

Alternatively or additionally, the thickness of the one supporting plate section is less than the thickness of the other supporting plate section.

Effect of Invention

With the steering column support apparatus of the present invention, (1) by engaging a vehicle-side bracket and locking member in the middle section in the width direction of the vehicle-side bracket such that an impact load that is applied during a secondary collision acts in the axial direction of the steering column in nearly the center of the middle section in the width direction of the vehicle-side bracket, displacement in the forward direction of the steering column that is connected to the fastening member by way of a column-side bracket can be performed stably without the center axis inclining excessively. Therefore, tuning in order to allow stable displacement in the forward direction of the steering wheel during a secondary collision becomes easier.

Moreover, (2) by fastening the displacement-side bracket to the top side portion of the steering column, it is possible to shorten the distance from the center of the adjustment rod, which is the input section of an impact load that is applied to the column-side bracket during a secondary collision, to the connecting section between the locking member and the column-side bracket, so it is possible to keep the moment that is applied to the column-side bracket due to an impact load low. Therefore, it is also possible to keep the force in the twisting direction that is applied at the area of engagement between the locking member that is supported on the top surface of the column-side bracket and the locking section with material removed that is formed in the vehicle-side bracket low. Consequently, it becomes possible to eliminate strong rubbing between bottom surface of the vehicle-side bracket and the top surface of the column-side bracket, and to keep the absolute value of and fluctuation in the break away load small.

In addition, (3) by fastening the displacement-side bracket to the top side portion of the steering column, it is possible to keep the column-side bracket and the displacement-side bracket from protruding downward further than the bottom surface of the steering column. As a result, it becomes difficult for the bottom end section of the column-side bracket and displacement-side bracket to hit against the driver's knees, and thus it becomes possible to more completely protect the driver during a collision accident, and to maintain the freedom of design of the steering apparatus.

Furthermore, additionally, (4) by making the rigidity of a specified portion of the pair of support plate sections of the column-side bracket low, when fastening of the position of the displacement-side bracket with respect to the column-side bracket is released, the force by which the support plate sections hold the displacement-side bracket decreases sufficiently. Therefore, it is possible to improve operability when adjusting the position of the steering wheel.

MODES FOR CARRYING OUT INVENTION

FIRST EXAMPLE

Figure 1:
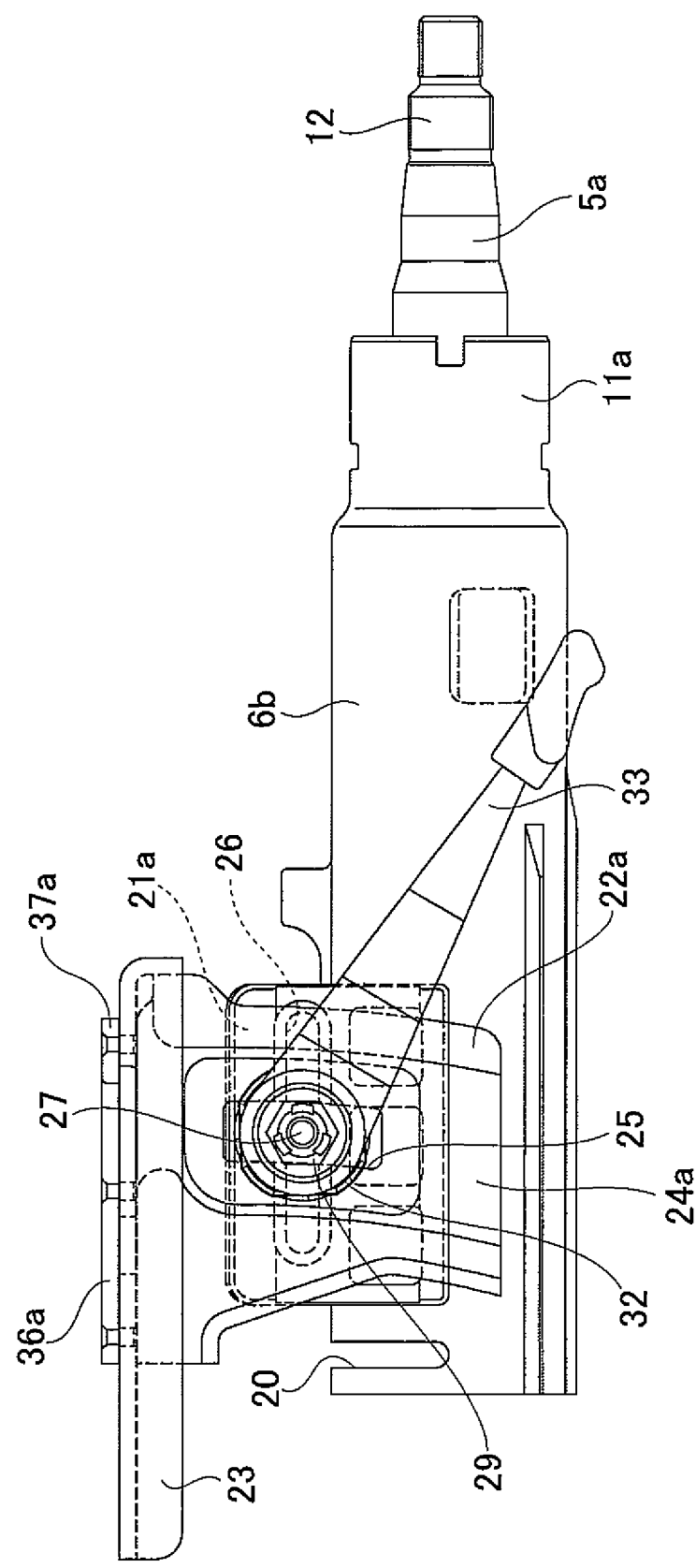
FIG. 1 is a side view illustrating a first example of an embodiment of the present invention.
Figure 2:
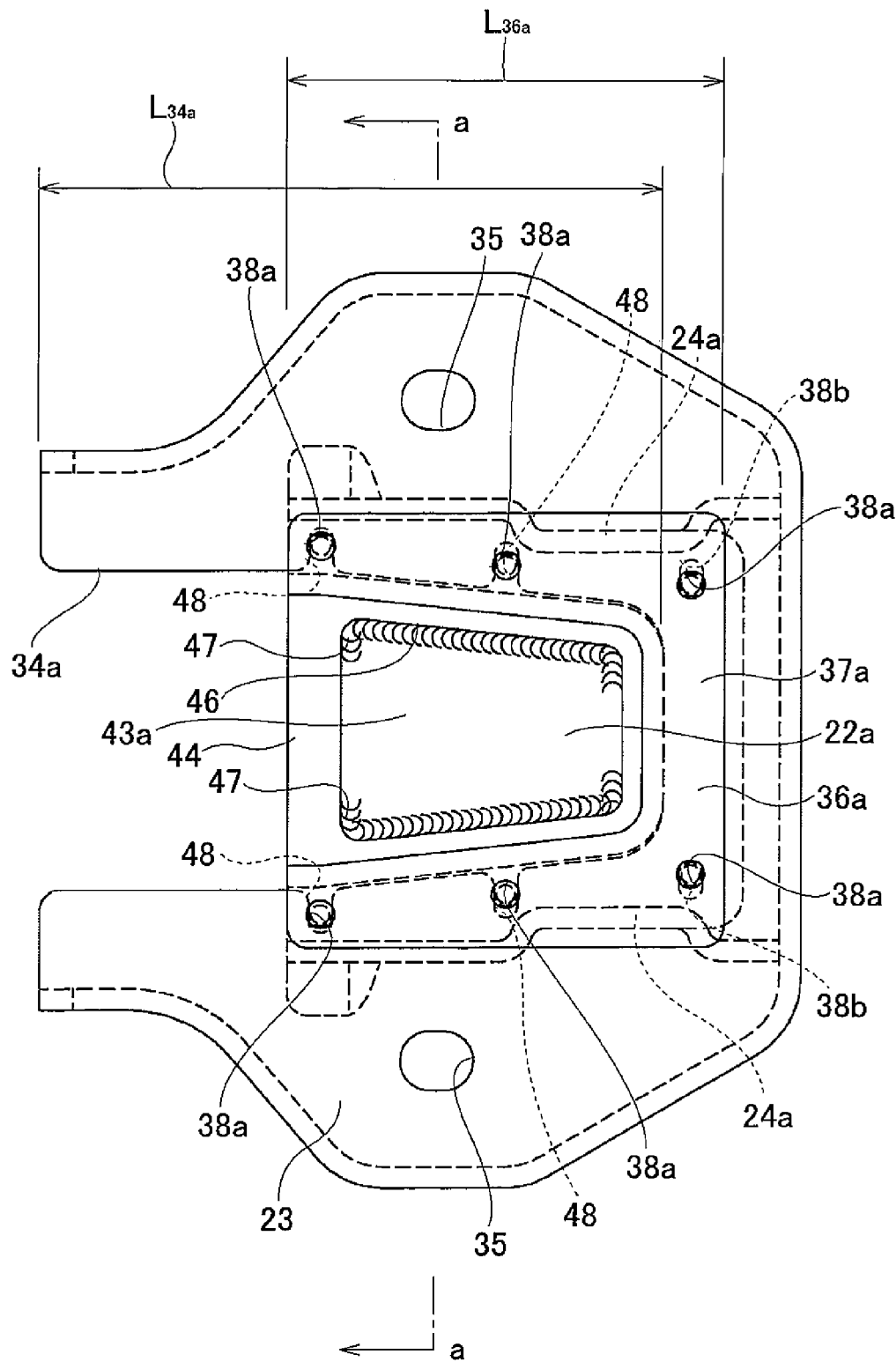
FIG. 2 is a top view of the major parts of the left end section in FIG. 1.
Figure 3:
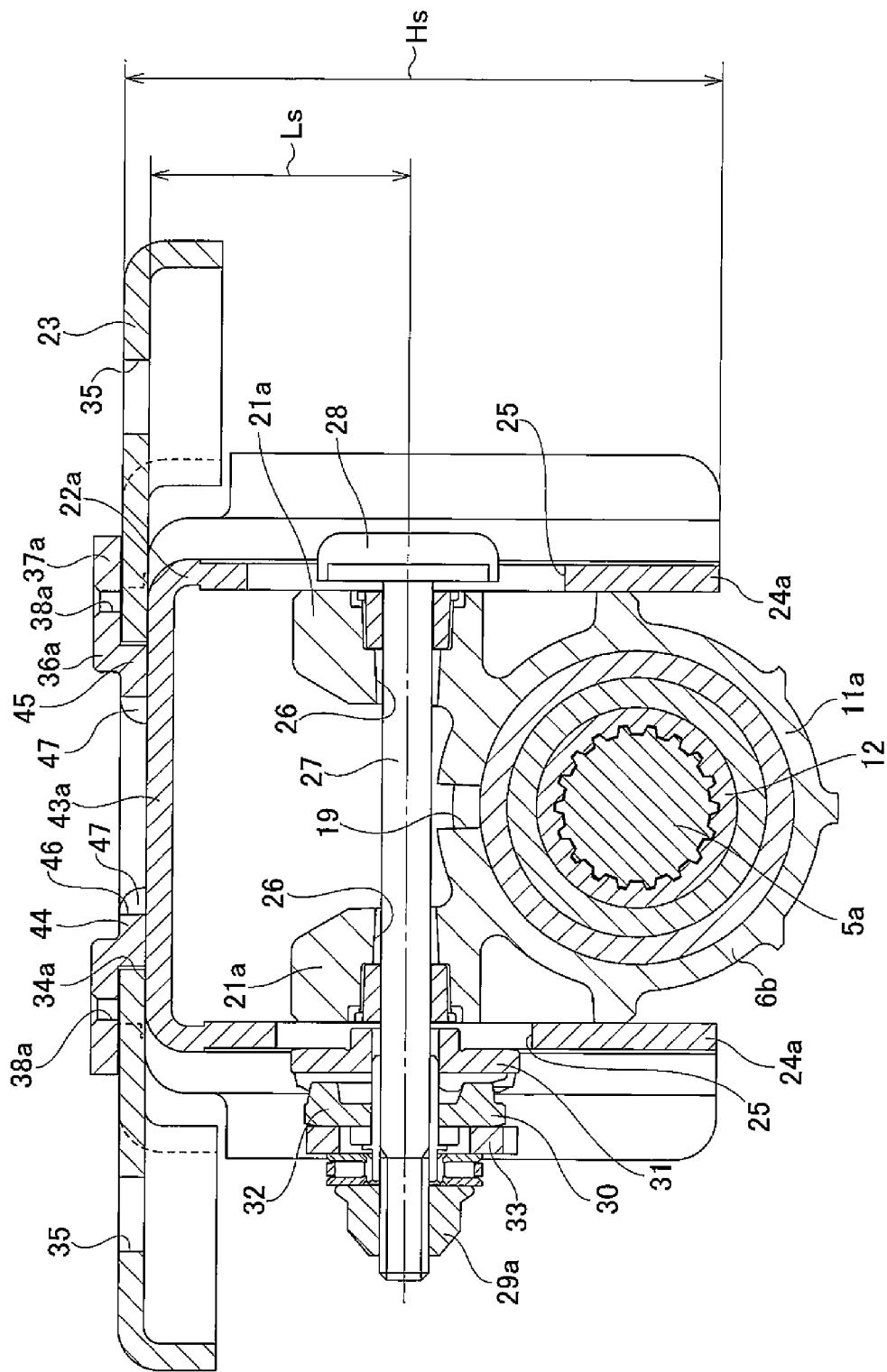
FIG. 3 is a cross-sectional view of section a-a in FIG. 2.
Figure 16:
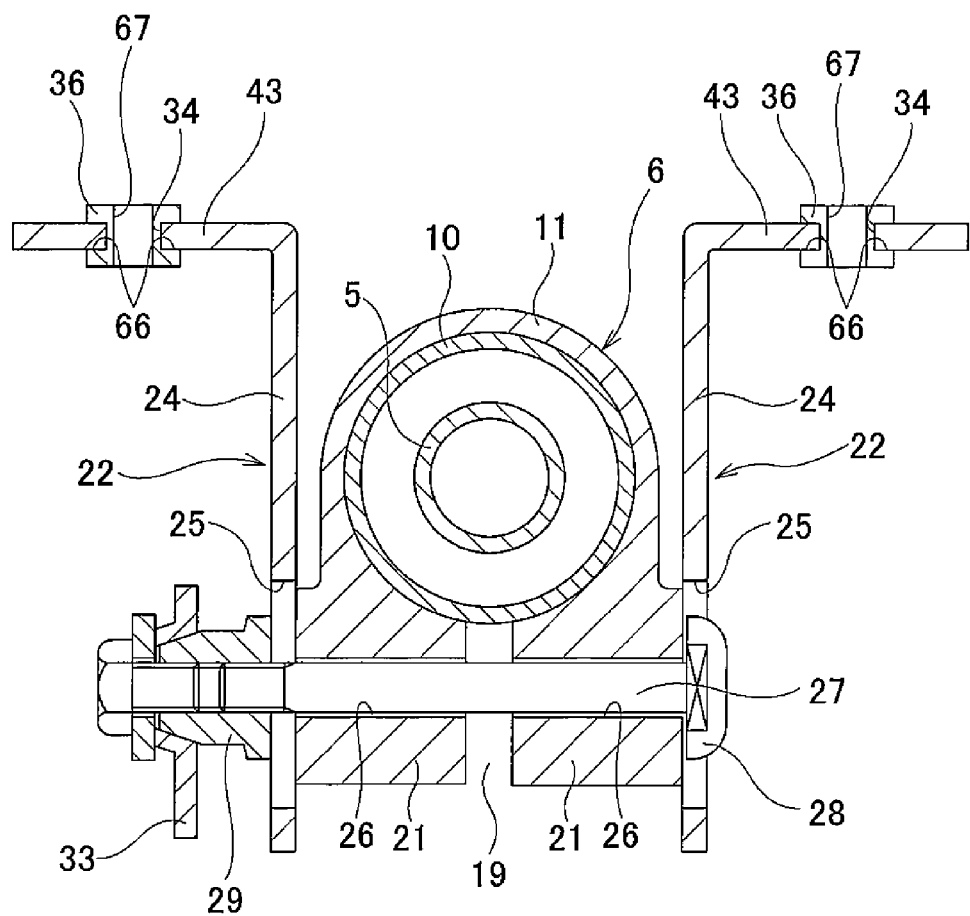
FIG. 16 is a cross-sectional view corresponding to FIG. 2, and illustrates an example of conventional construction for supporting a steering column.

FIG. 1 to FIG. 3 illustrate a first example of an embodiment of the present invention. The steering apparatus to which the steering column support construction of this example is applied comprises both a tilt mechanism and telescopic mechanism. Construction for achieving the tilt mechanism and the telescopic mechanism is basically the same as the conventional construction illustrated in FIG. 16. However, in this example, in the outer column 11a, which is integrally formed by die casting of a light alloy such as aluminum alloy, supported plate sections 21a are provided on the top surface of the front half section of the outer column 11a so as to be separated in the width direction. In other words, construction for supporting the outer column 11a on the vehicle side is not provided on the bottom surface side of the outer column 11a.

Moreover, in this example, a cam apparatus 32 that includes a driving-side cam 30 and a driven-side cam 31 is provided between the nut 29a that is screwed onto the tip end section (left end section in FIG. 3) of the adjustment rod 27 and the outside surface of the other support plate section 24a (left side plate section in FIG. 3), and this driving-side cam 30 can be rotated and driven by the adjustment lever 33. In this construction, by rotating and driving the driving-side cam 30 by rotating the adjustment lever 33, contacting the dimension in the axial direction of the cam apparatus 32 and expanding the space between the inside surfaces of the driven-side cam 31 and the head section 28 that face each other, the support plate sections 24a release the force that holds the supported plate sections 21a. Conversely, by rotating the adjustment lever 33 in the opposite direction, the dimension in the axial direction of the cam apparatus 32 expands and the space between the inside surfaces of the driven-side cam 31 and the head section 28 that face each other is contracted, which causes the support plate sections 24a to firmly hold the supported plate sections 21a.

In the steering apparatus of this example as well, construction is employed wherein the column-side bracket 22a is normally supported by the vehicle body, however, during a collision accident, the column-side bracket 22a breaks away in the forward direction due to the impact of a secondary collision, which allows the outer column 11 to displace in the forward direction. In this example, the column-side bracket is formed by using a press to punch and bend a metal plate such as steel plate that has sufficient strength and rigidity, and includes a pair of support plate sections 24a, and a top plate section 43a that is continuous with the edges on the top ends of these support plate sections 24a such that the cross-sectional shape is a nearly U shape. Moreover, in the construction of this example, the column-side bracket 22 is not directly fastened to the vehicle body, but is supported by a vehicle-side bracket 23, which is fastened to the vehicle side and does not displace in the forward direction during a secondary collision, so as to be able to break away in the forward direction due to an impact load that is applied during a secondary collision.

The vehicle-side bracket 23 is also formed by using a press to punch and bend a metal plate such as steel plate that has sufficient strength and rigidity. By bending downward the edge sections on both sides and the edge section on the rear end of the vehicle-side bracket 23, the bending rigidity of the vehicle-side bracket 23 is improved. The vehicle-side bracket 23 comprises a locking notch 34*a* that is open on the edge of the front end in the center section in the width direction, and a pair of installation holes 35 that are on both the left and right sides of the locking notch 34*a*. The locking notch 34*a* extends to near the rear end section of the vehicle-side bracket 23. The vehicle-side bracket 23 is supported by and fastened to the vehicle by bolts or studs that are inserted through the installation holes 35. This locking notch 34*a* corresponds to a locking section with material removed.

The column-side bracket 22*a* is connected to the vehicle-side bracket 23 by way of a locking capsule 36*a*, which is a locking member, such that the column-side bracket 22*a* can break away in the forward direction during a secondary collision. More specifically, the locking capsule 36*a* that is locked into the perimeter edge section of the locking notch 34*a* that is formed in the vehicle-side bracket 23 is connected and fastened to the top plate section 43*a* of the column-side bracket 22*a* by welding. Therefore, preferably both the column-side bracket 22*a* and the locking capsule 36*a* are manufactured by bending the same kind of metal plate such as carbon steel plate that can be welded together. The locking capsule 36*a* comprises a base plate section 44 that is placed on the top surface of top plate section 43*a*, a bent section 45 that is bent upward from the edges on the left and right sides and the edge on the rear end of the base plate section 44, and a flange section 37 that is bent toward the left and right sides and toward the rear from the edges on the top ends of the bent section 45. The base plate section 44 and the top plate section 43*a* are welded and fastened by a weld 47 such as fillet weld in the portion of the inner perimeter edge of a through hole 46 that is formed in the center section of the base plate section 44. Synthetic resin is injected and hardened in a plurality of small through holes 38*a* that are formed in the flange section 37 and in notches 48, which are formed so as to be open on inner perimeter edge of the locking notch 34*a*, and small through holes 38*b* that are formed in part of the vehicle-side bracket 23, connecting the column-side bracket 22*a* and the locking capsule 36*a* to the vehicle-side bracket 23 such that the column-side bracket 22*a* can break away in the forward direction due to an impact load that is applied during a secondary collision. It is also possible to employ construction wherein notches 48 are not formed, and only small through holes 38*b* are formed in the vehicle-side bracket 23. Moreover, in the example, the number of the locations of these connecting sections is six, however, this number is also arbitrary. Furthermore, instead of injecting synthetic resin and letting the resin harden, it is possible to pressure fit locking pins that are made of light alloy such as aluminum alloy.

The locking capsule 36*a* of this example can also be supported by and fastened to the vehicle-side bracket 23 without the use of bolts and nuts or studs, which is advantageous in that the height of the assembly in the portion can be made smaller by that amount. However, in the present invention, the construction of the locking capsule is not limited to this, and any arbitrary construction can be employed as long as it is possible to fasten the column-side bracket and have engagement with the locking section with material removed such as the locking notch. For example, it is also possible to use construction wherein a locking capsule, which is made of a light alloy such as an aluminum alloy, whose width dimension in the left-right direction and the length dimension in the forward-backward direction are larger in the upper half section than in the lower half section, and that comprises a flange section that protrudes toward both the left and right side and toward the rear, is fastened to the column-side bracket by bolts and nuts or by studs.

In the support construction for a steering column of this example, a locking capsule 36*a* is located in the portion directly above the outer column 11*a*. Therefore, an impact load that is applied during a secondary collision is applied to nearly the center section of the locking capsule 36*a* in the axial direction of the outer column 11*a*. In other words, the impact load that is transmitted during a secondary collision from the steering wheel 1 to the locking capsule 36*a* by way of the outer shaft 12 and the outer column 11*a* is uniformly applied to the synthetic resin or locking pins that connect the locking capsule 36*a* and the vehicle-side bracket 23, so they shear at substantially the same time. As a result, displacement of the outer column 11*a* in the forward direction is performed stably with no excessive inclination of the center axis thereof. In this way, regardless of the condition of the secondary collision, a moment that is applied in a direction that makes it difficult for the locking capsule 36*a* to come out from the locking notch 34*a* is suppressed. As a result, the impact load can be effectively used as a force in the direction that the locking capsule 36*a* comes out in the forward direction from the locking node 34*a*, so tuning in order to cause stable displacement in the forward direction of the steering wheel 1 during a secondary collision becomes easier.

Figure 4:
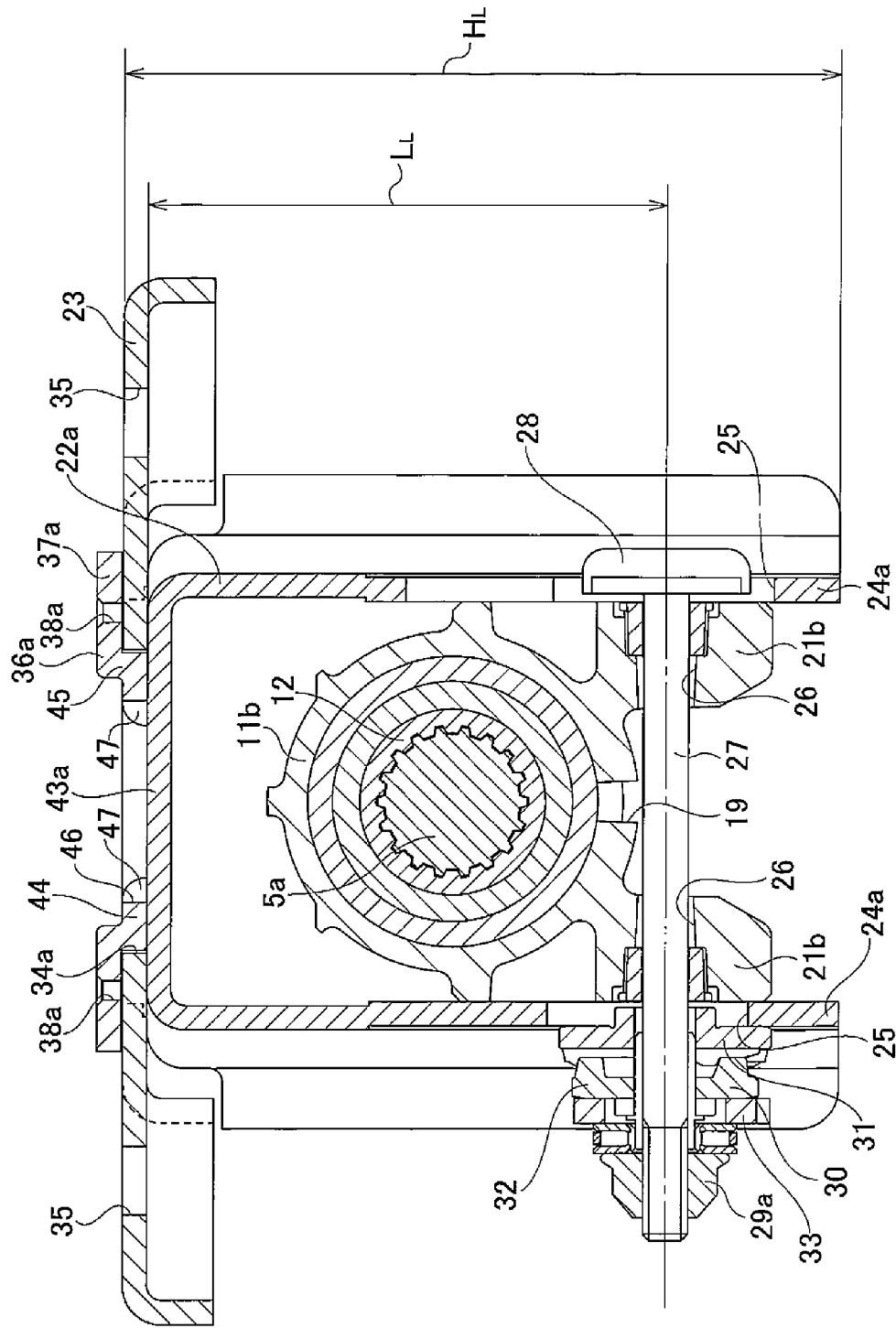
FIG. 4 is a drawing similar to FIG. 3 and illustrates construction for comparison with the present invention.
Figure 5:
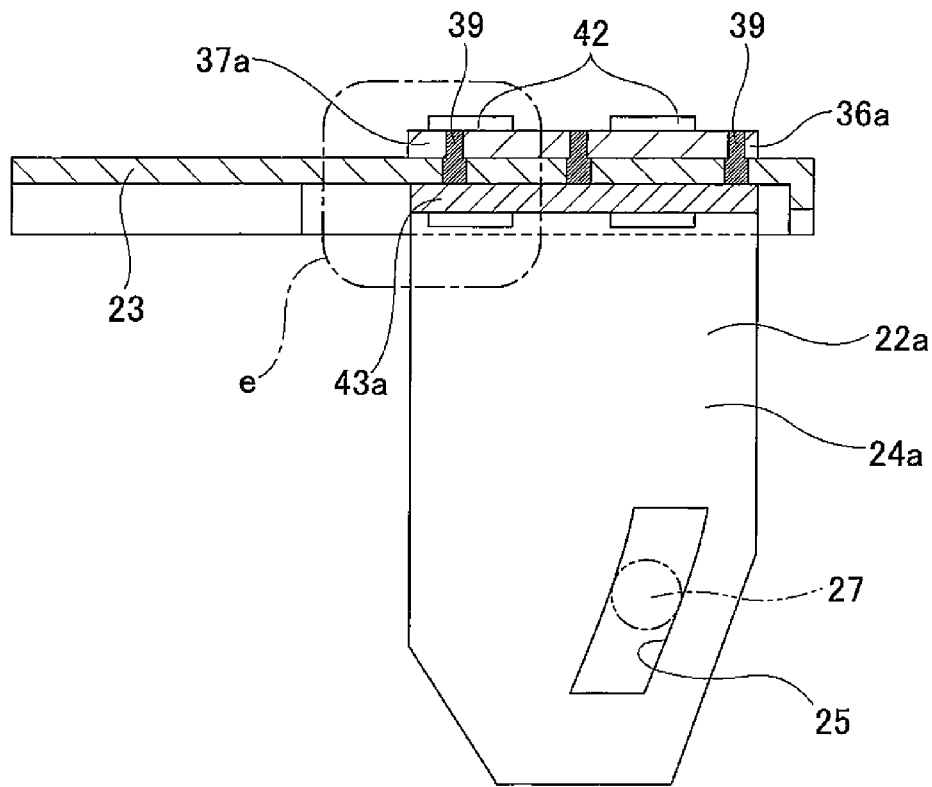
FIG. 5A is a drawing that corresponds to the side view as seen from the left side in FIG. 4, and is for explaining the reason why the break away load becomes large during a secondary collision in construction similar to the construction illustrated in FIG. 4.
FIG. 5B is an enlarged view of part e in FIG. 5A.
Figure 5:
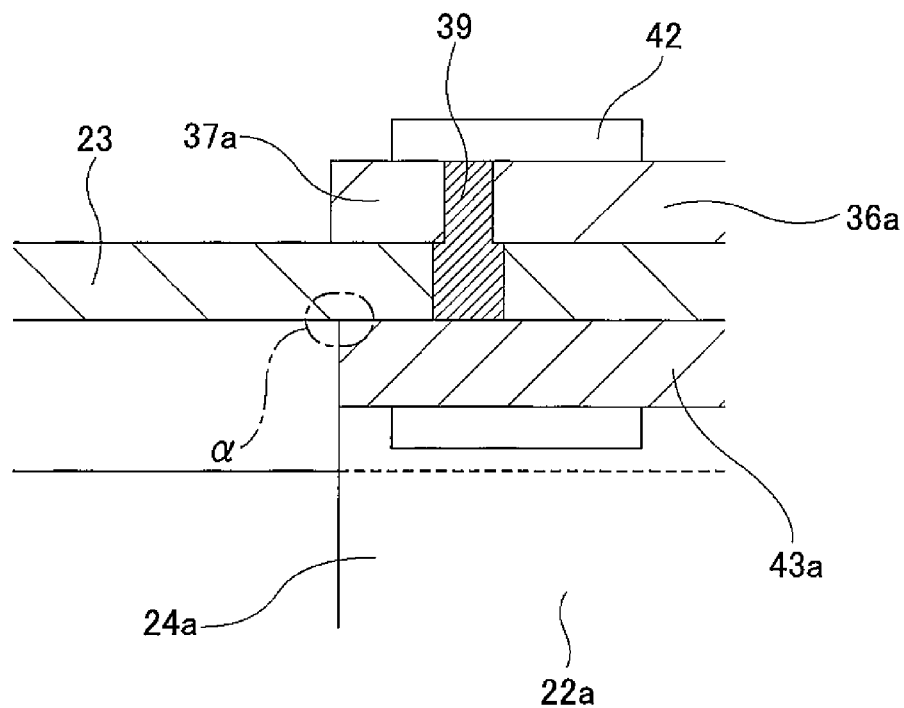

Moreover, the supported plate sections 21*a* are fastened to portions on the upper side of the outer column 11, as illustrated in FIG. 3, it is possible to shorten the distance $L_S$ from the center of the adjustment rod 27 to the connecting section between the locking capsule 36*a* and the top plate section 43*a* of the column-side bracket 22*a*. On the other hand, as illustrated in FIG. 4 and FIG. 5, in the case of construction wherein the supported plate sections 21*b* are fastened to portions on the bottom side of the outer column 11*b*, the distance $L_L$ from the center of the adjustment rod 27, which is the input section of the impact load, to the connecting section between the locking capsule 36*a* and the top plate section 43*a* becomes long. The size of the moment that is applied to the column-side bracket 22*a* due to an impact load is proportional to the distance $L_S$, $L_L$, which is the length of the span of this moment. In other words, when the impact load during a secondary collision is inputted to the column-side bracket 22*a* from the adjustment rod 27, the adjustment rod 27 strongly presses the edge on the front inside of the long hole 25 in the up-down direction. As a result, with the adjustment rod 27 as the power point (input section) and the connecting section between the locking capsule 36*a* and the column-side bracket 22*a* as the fulcrum point, a moment in the clockwise direction in FIG. 1 and FIG. 5A is impulsively applied to the column-side bracket 22*a*. When the adjustment rod 27 is located underneath the steering column 6, the distance from the center of the adjustment rod 27 to the connecting section between the locking capsule 36*a* and the column-side bracket 22*a* (fulcrum point) is large and the impulsively applied moment becomes large.

Due to this impulsively applied moment, the edge section on the front end of the top surface of the top plate section 43*a* in the portion enclosed in the chain line α in FIG. 5B is strongly pressed against the bottom surface of the vehicle-side bracket 23 as a secondary collision advances, and a large friction force acts in this portion. Therefore, the break away load that is required for coming out from the locking notch 34 that is formed in the vehicle-side bracket 23 becomes large and unstable. Such a state is not desirable from the aspect of more completely protecting the driver. The surface pressure that is applied to the area of contact in the portion enclosed by the chain line α in FIG. 5B becomes higher the greater the moment is, and this moment becomes greater the greater the distance is between the connecting section, which is the fulcrum point, and the input section of the impact load.

On the other hand, with the construction of this example, the moment in the clockwise direction in FIG. 1 that is applied to the column-side bracket 22a during a secondary collision can be reduced by the amount that the distance $L_S$ can be shortened. Therefore, by keeping the contact pressure in the area of rubbing between the edge section on the front end of the top surface of the top plate section 43a and the bottom surface of the vehicle-side bracket 23 low, it is possible to reduce the friction force that acts at the area of engagement between the locking capsule 36a and the column-side bracket 22a. It is also possible to keep the absolute value and fluctuation in the break away load in the forward direction of the column-side bracket 22a during a secondary collision low.

Furthermore, the supported plate sections 21a are fastened to the portion on the top side of the outer column 11a, so the bottom end sections of the support plate sections 24a of the column-side bracket 22a that hold these supported plate sections 21a do not protrude by a large amount further downward than the bottom surface of the outer column 11a. In other words, as illustrated in FIG. 3, the assembly height $H_S$, which is the distance from the top surface of the vehicle-side bracket 23 and the edges on the bottom ends of the support plate sections 24a can be made to be shorter than the assembly height $H_L$ of the construction illustrated in FIG. 4. As a result, it becomes difficult for the knees of the driver to collide with the bottom end section of the support plate sections 24a and supported plate sections 21a, so it is possible to ensure freedom of design of the steering apparatus, while enriching protection of the driver during a collision accident. Moreover, there is an advantage from the aspect in that the support apparatus for a steering column can be made more compact and lightweight by the amount that the assembly height $H_S$ can be shortened.

Furthermore, there is an advantage from the aspect of maintaining support rigidity of the steering column 6a, including the outer column 11a, with respect to the vehicle-side bracket 23, and particularly maintaining the rigidity in the width direction. In other words, the adjustment rod 27 is located above the steering column 6b, so it is possible to shorten the distance between the section tightened by this adjustment rod 27 and the vehicle-side bracket 23. As a result, it is possible to suppress displacement in the width direction of the steering column 6b due to a moment that is inputted to the column-side bracket 22a from the section tightened by this adjustment rod 27.

Moreover, in this construction, the length $L_{34a}$ in the forward-backward direction of the locking notch 34a is sufficiently larger than the length $L_{36a}$ in the same direction of the locking capsule 36a ($L_{34a} \gg L_{36a}$). Therefore, even in a state in which the locking capsule 36a has displaced all the way in the forward direction (cannot displace any further in the forward direction due to an impact load that is applied from the steering wheel 1), the portion of at least the rear end section of the flange section 37 of the locking capsule 36a that is capable of supporting the weight of the steering column 6a, column-side bracket 22a and the like does not completely come out from the locking notch 34a, and the steering column 6a and column-side bracket 22a are prevented from dropping. Therefore, even in a state in which a secondary collision has advanced, it is possible to maintain the support force of the outer column 11a and prevent the steering wheel 1 from dropping excessively, and even after a collision, in addition to the vehicle involved in the accident being able to move on its own, it is possible to maintain operability of the steering wheel.

In this example, in order to engage the bent section 45 of the locking capsule 36a with the locking notch 34a, the edges on the left and right sides of the locking notch 34a formed in the vehicle-side bracket 23 is sloped in a direction such that the width dimension of the locking notch 34a becomes more narrow going toward the rear. Moreover, part of the synthetic resin enters from the notches 48 into a minute gap between the edges on the left and right sides of the locking notch 34a and the outside surfaces on the left and right of the bent sections 45, preventing metallic contact between the edges on the left and right sides and the outside surfaces on the left and right of the bent sections 45. In this example, with this kind of construction, it becomes easy for the locking capsule 36a to come out in the forward direction from the locking notch 34a.

SECOND EXAMPLE

Figure 6:
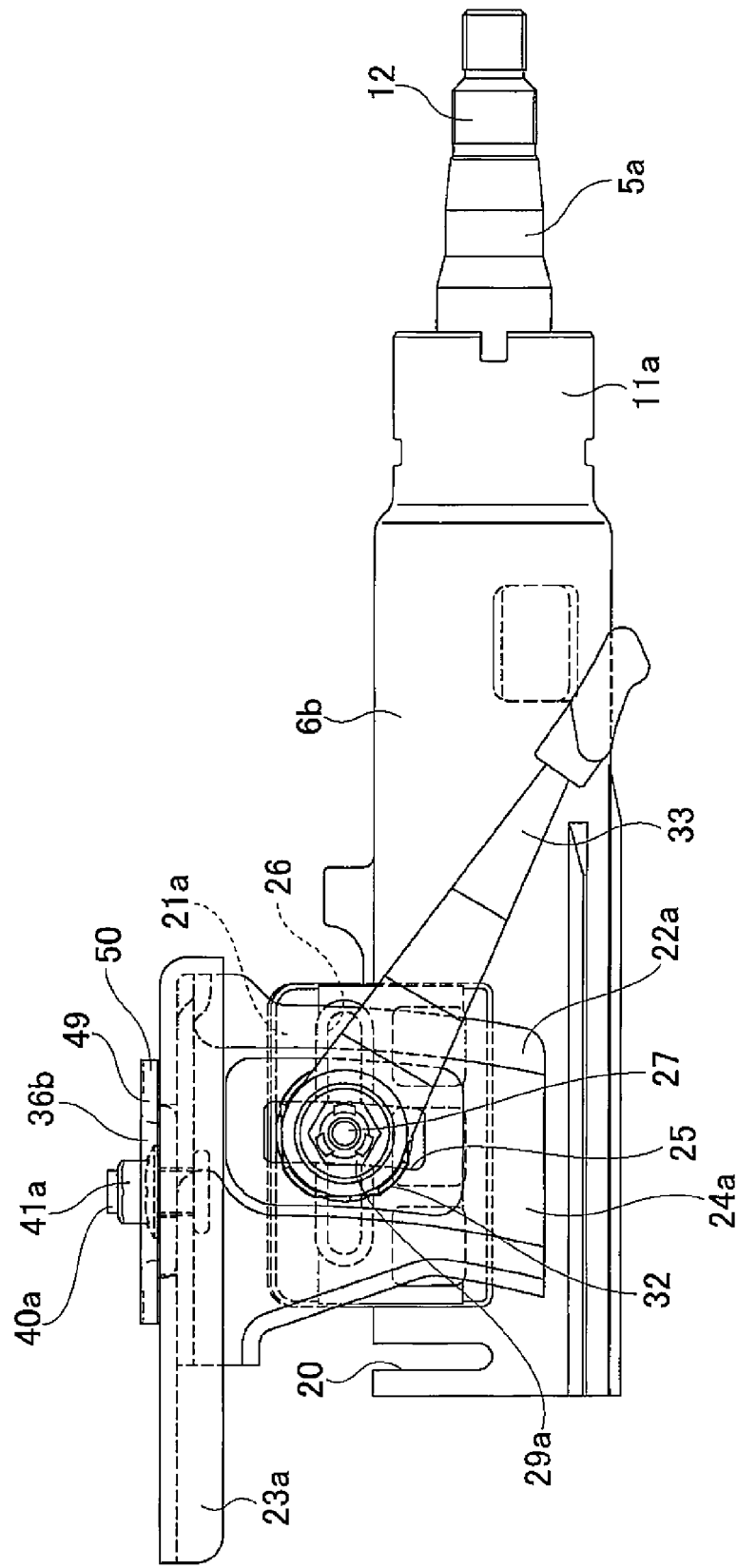
FIG. 6 is a side view illustrating a second example of an embodiment of the present invention.
Figure 7:
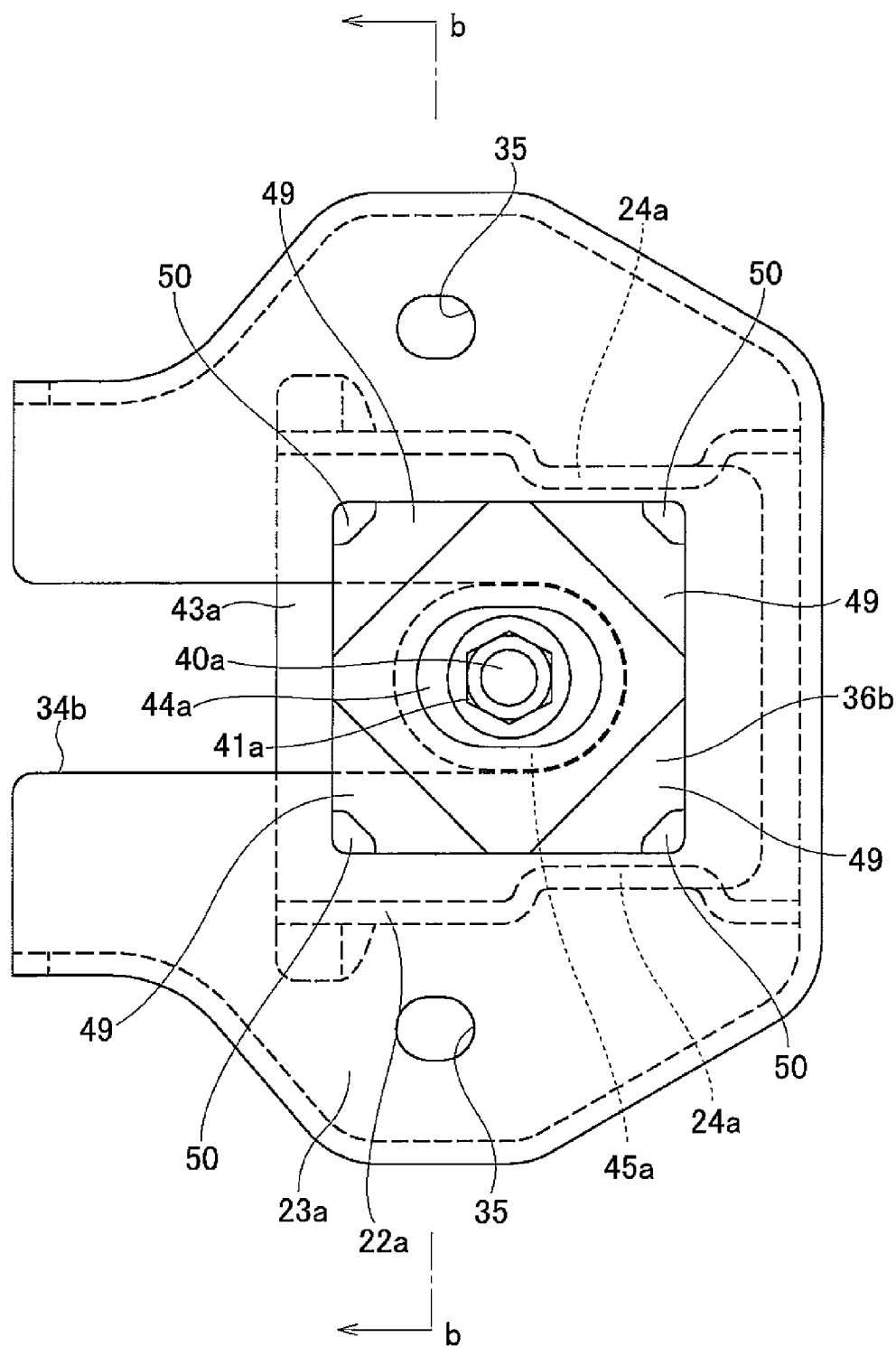
FIG. 7 is a top view of the major part of the left end section in FIG. 6.
Figure 8:
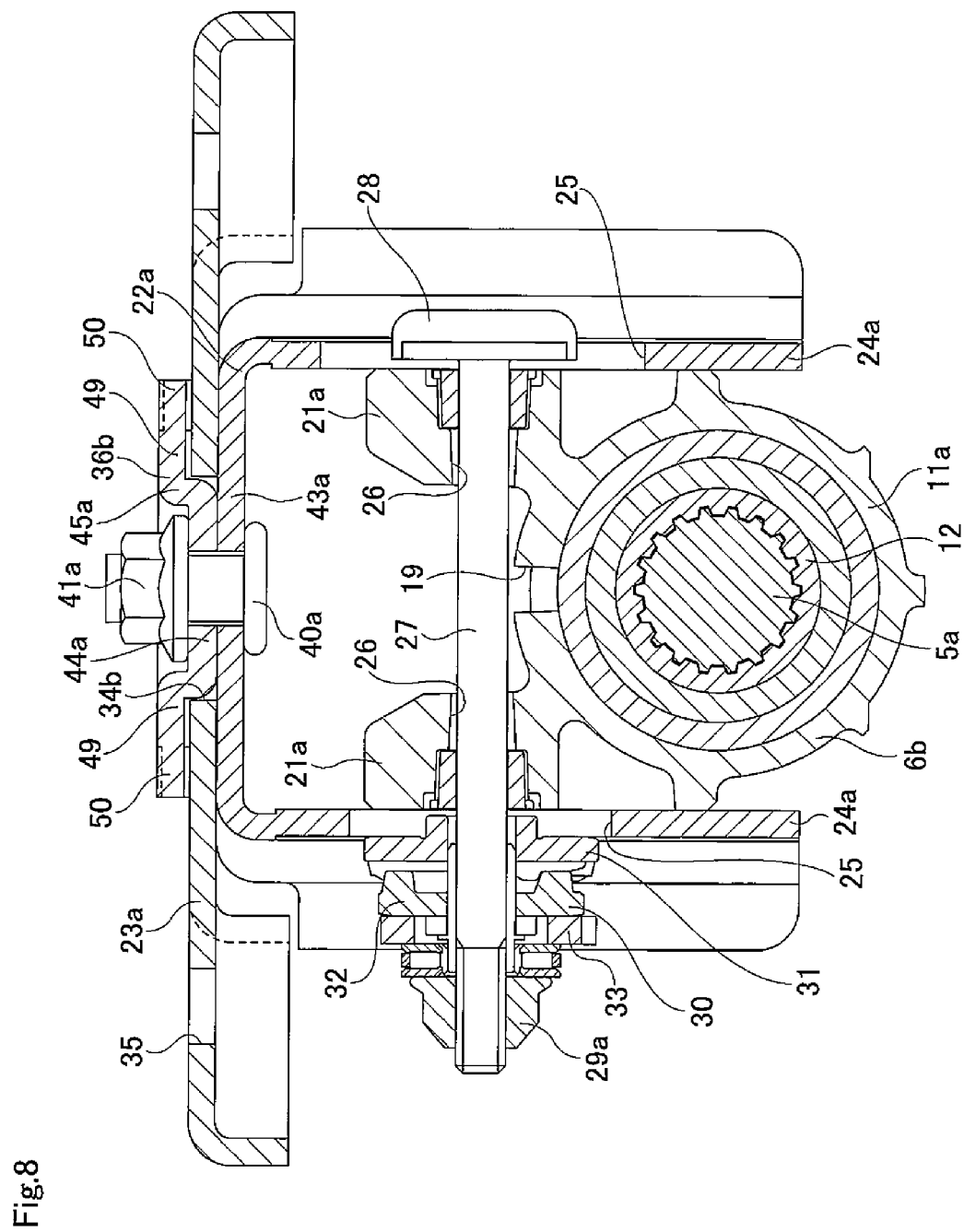
FIG. 8 is a cross-sectional view of section b-b in FIG. 7.

FIG. 6 to FIG. 8 illustrate a second example of an embodiment of the present invention. In the construction of this example, the construction of the portion in which the column-side bracket 22a and the locking capsule 36b are connected to and supported by the vehicle-side bracket 23a so as to be able to break away in the forward direction due to a secondary collision differs from that in the first example. In this example, the locking notch 34b that is formed in the vehicle-side bracket 23a has a U shape which is long in the forward-backward direction, and, except for the portion where an semicircular arc section is provided on the back section on the rear end and a chamfer section that is provided on the opening on the front end, the width dimension is constant.

On the other hand, the locking capsule 36b is obtained by bending a metal plate such as carbon steel plate or stainless steel plate, which has elasticity and the necessary strength and rigidity; the locking capsule 36b comprises a base plate section 44a, a bent section 45a and elastic pressure plate sections 49 at four locations. The base plate section 44a is a flat oval (elliptical) planar shape, with the short diameter (width) being a little less than the width of the locking notch 34b, and the long diameter (length) being sufficiently larger than the width of the locking notch 34b. Moreover, the elastic pressure plate section 49 is provided in a state that pulls from the edge on the top end of the bent section 45a toward both end section in the forward-backward direction on both the left and right side. In the free state where no external force is applied to the locking capsule 36b, the distance in the thickness direction of the base plate section 44a from the bottom surface of the base plate section 44a to the bottom surface of the protruding section 50 that is provided on the tip end section of the elastic pressure plate section 49 is shorter than the thickness dimension of the vehicle-side bracket 23a.

This kind of locking capsule 36b is such that when the bent section 45a is located at the back section of the locking notch 34b, the bottom surface of the base plate section 44a and the top surface of the top plate section 43a of the column-side bracket 22a face each other. A bolt 40a that is inserted into through holes, which are formed in portions of the base plate section 44a and top plate section 43a that are aligned with each other, is screwed into a nut 41a, and by further tightening, the bottom surface of the base plate section 44a and the top surface of the top plate section 43a of the column-side bracket 22a come in contact. In this state, the bottom surface of the tip end section of the elastic pressure plate section 49 strongly presses the edges on both sides of the locking notch 34b on the top surface of the vehicle-side bracket 23a. During a secondary collision, the top surface of the vehicle-side bracket 23a and the bottom surface of the protruding section 50 rub, as the column-side bracket 22a displaces (breaks away) in the forward direction. The construction and function of the other parts are the same as in the first example.

THIRD EXAMPLE

Figure 9:
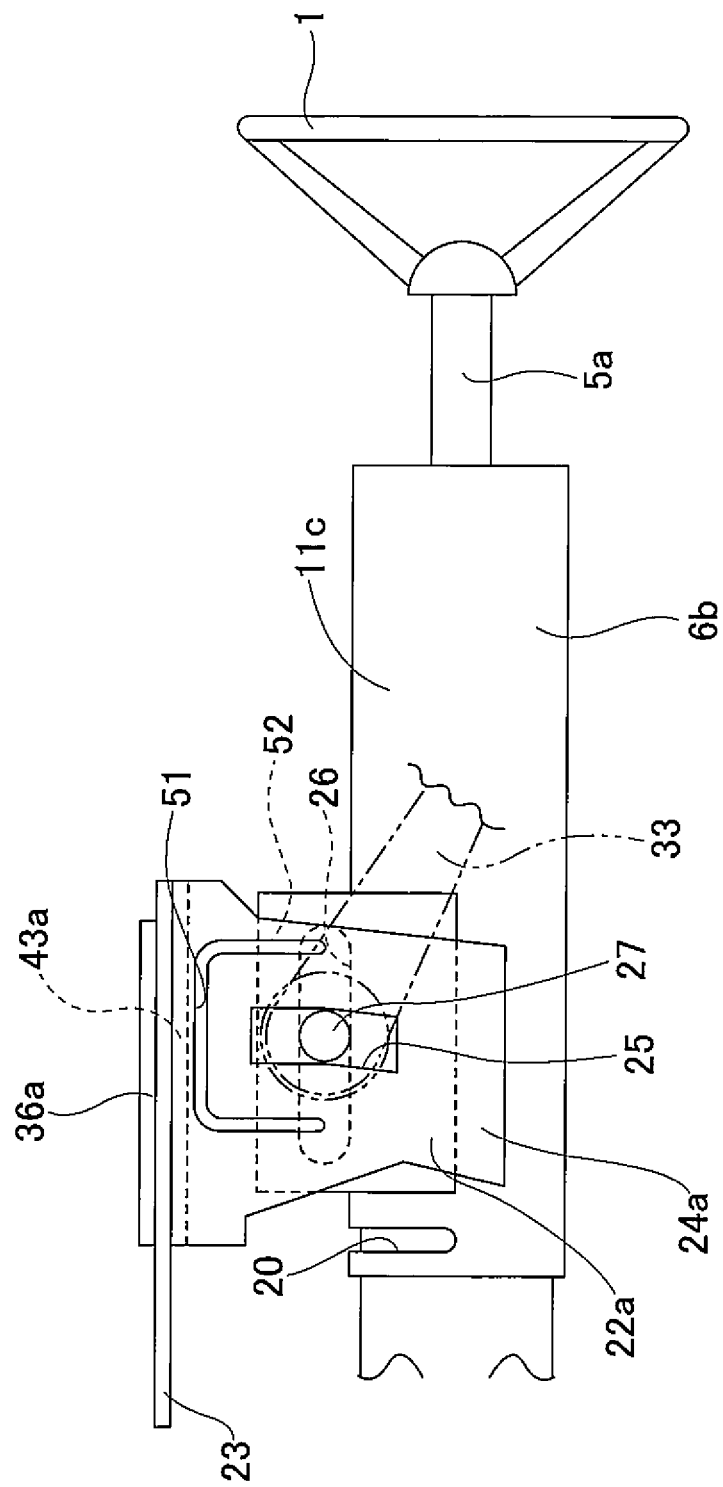
FIG. 9 is a simplified side view illustrating a third example of an embodiment of the present invention in which the first example of construction for improving the operability of adjusting the position of the steering wheel is assembled.

FIG. 9 illustrates a third example of an embodiment of the present invention. In this example, in part of at least one (preferably both) of the pair of left and right support plate sections 24a of the column-side bracket 22a, the rigidity in the width direction of the portion where the long holes 25 in the up-down direction, through which the adjustment rod 27 is inserted, is less than in other portions. In order for this, in this example, a slit 51 is formed in the portion of part of at least one of the support plate sections 24a adjacent to the long hole 25 in the up-down direction. As long as the rigidity in the width direction of the portion that is pressed by the pressure section that is provided on the end section of the adjustment rod 27 can be made to be low, it does not particularly matter what shape the slit 51 is. As in the example illustrated in the figure, the slit can be U shaped so as to surround the upper half section of the long hole 25 in the up-down direction on three sides, or the slit can be long slits in the up-down direction that are formed in the portions on both the front and rear sides of the long hole 25 in the up-down direction.

In the construction of this example, the rigidity in the width direction of the portion of the support plate sections 24a through which the adjustment rod 27 is inserted is low, so when the space between the pair of pressure section that are provided on both end sections of the adjustment rod 27 is expanded in order to adjust the position of the steering wheel 1, the force by which the support plate sections 24a hold a displacement-side bracket 52 sufficiently decreases. In other words, in this example, a displacement-side bracket 52 is located above the outer column 11c, so the installation portion of the adjustment rod 27 is located in the up-down direction between the outer column 11c and the vehicle-side bracket 23. Therefore, when the rigidity in the width direction of the portion of the support plate sections 24a through which the adjustment rod 27 is inserted is high, the contact pressure between the inside surfaces of the support plate sections 24a and the outside surfaces of the displacement-side bracket 52 does not decrease enough even when the space between the pair of pressure sections that are provided on both end sections of the adjustment rod 27 is expanded, so there is a possibility that the force required for adjusting the position of the steering wheel 1 cannot be made sufficiently low.

On the other hand, in the case of the construction of this example, with the existence of the slit 51, when the space between the pressure sections is expanded, the force by which the support plate sections 24a hold the displacement-side bracket 52 is decreased sufficiently, and the friction force that acts between the inside surfaces of the support plate sections 24a and the outside surface of the displacement-side bracket 52 is kept low, so it is possible to easily adjust the position of the steering wheel 1 with light force. Furthermore, after the steering wheel 1 has been adjusted to a desired position, by reducing the space between the pressure sections, the force for contracting the space between these pressure sections is effectively used as the force by which the inside surfaces of the support plate sections 24a hold the outside surface of the displacement-side bracket 5, and particularly, it is possible to maintain the steering wheel 1 in the adjusted position without having to increase the operating force of the adjustment lever 33 of the cam apparatus 32 for reducing the space between the pressure sections. The construction and functions of the other parts are the same as in the first or second examples.

FOURTH EXAMPLE

Figure 10:
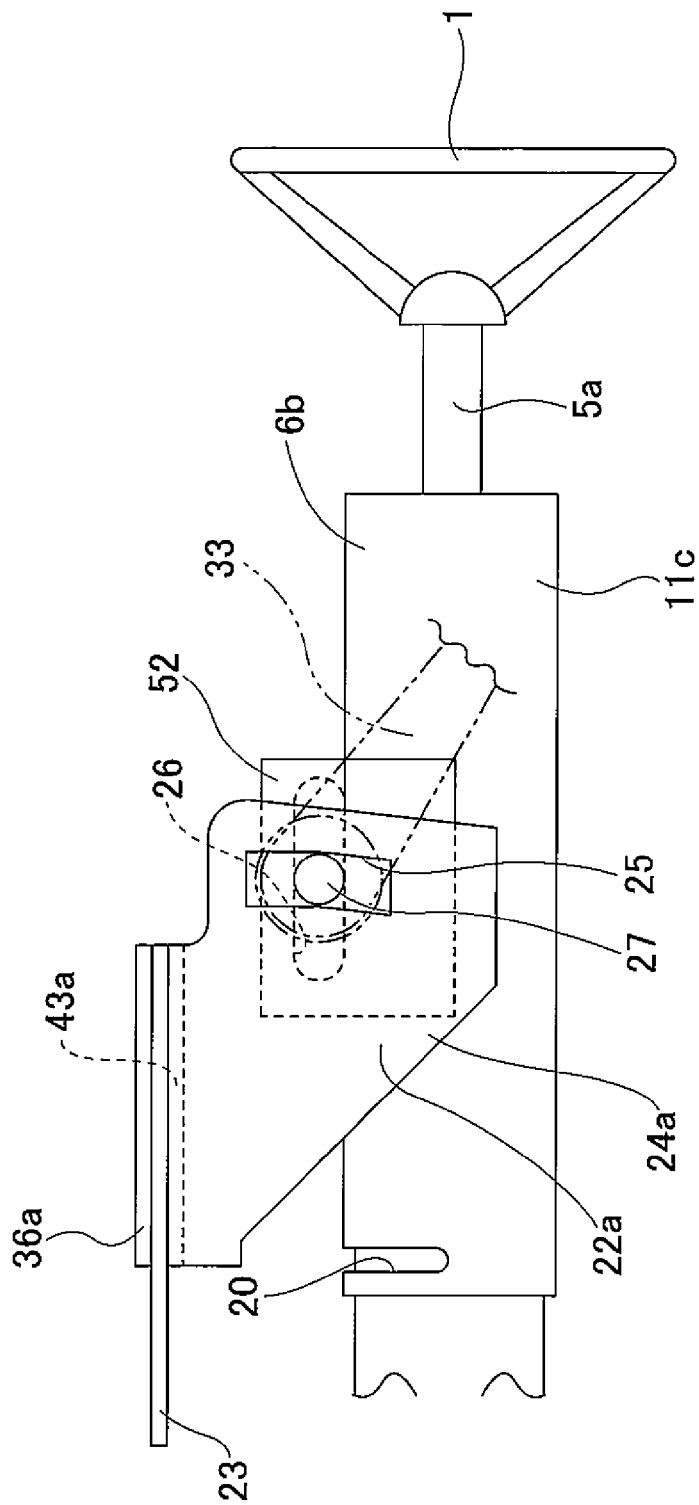
FIG. 10 is a simplified side view illustrating a fourth example of an embodiment of the present invention in which the second example of construction for improving the operability of adjusting the position of the steering wheel is assembled.

FIG. 10 illustrates a fourth example of an embodiment of the present invention. In this example as well, as in the case of the third example of the embodiment, the rigidity in the width direction of the portion of at least one (preferably both) of the pair of left and right support plate sections 24a where the long hole 25 in the up-down direction is formed through which the adjustment rod 27 is inserted is less than in the other portions. In this example, the portion of part of the support plate sections 24a where the long hole 25 in the up-down direction is formed is made to protrude further toward the rear than the connecting section between the column-side bracket 22a and locking capsule 36a and the vehicle-side bracket 23. The edge on the top end of this protruding portion is not connected to the other construction such as the top plate section 43a. In other words, of the support plate sections 24a, the portion on the rear end where the long hole 25 in the up-down direction is formed is connected to the other construction such as the top plate section 43a of the support plate sections 24a only on the front end side, and the rigidity in the width direction of this rear end portion is made lower. In the construction of this example as well, it is possible to more easily adjust the position of the steering wheel 1, and particularly it is possible to maintain the steering wheel 1 in the adjusted position without a large operating force.

FIFTH EXAMPLE

Figure 11:
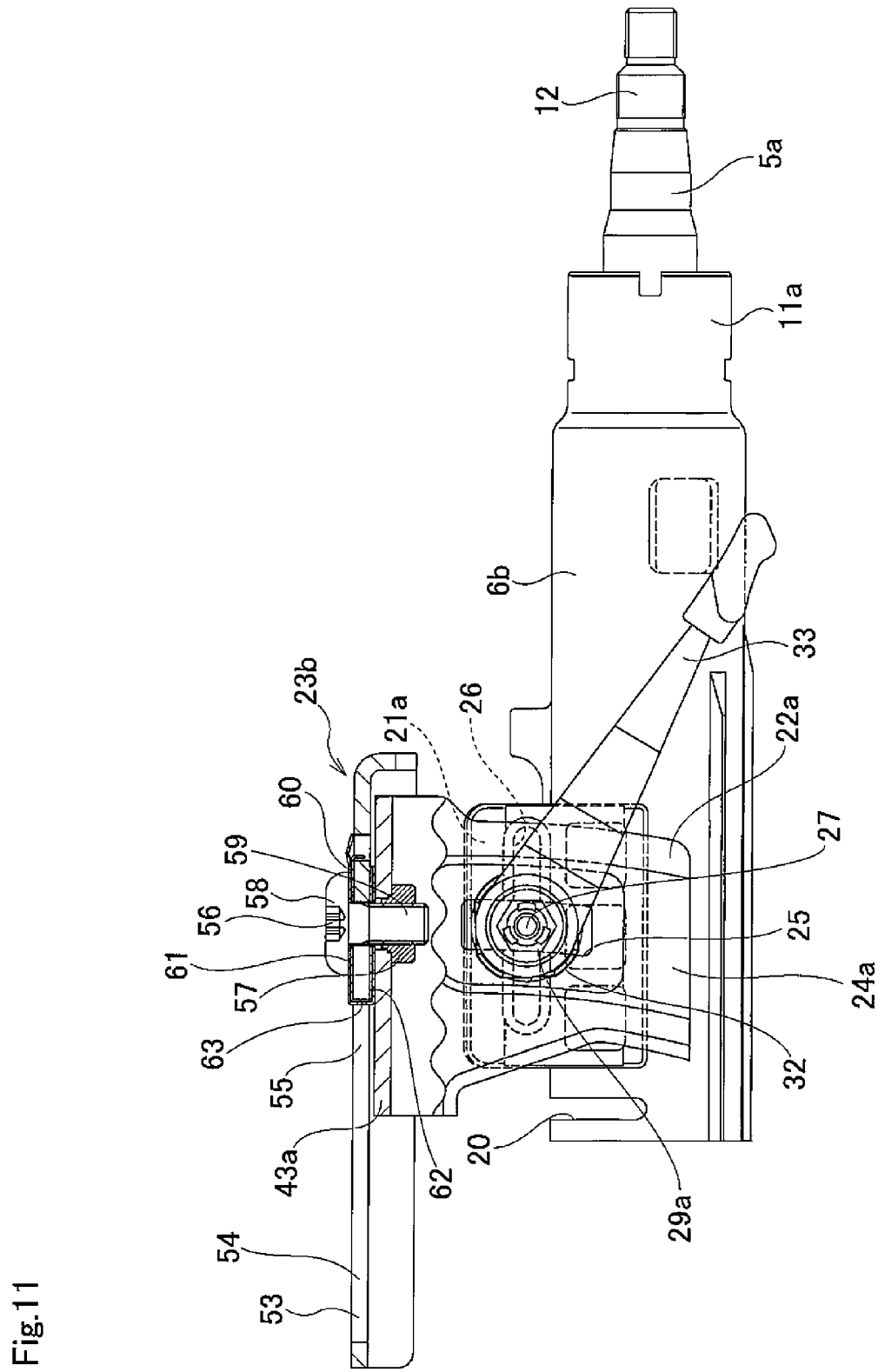
FIG. 11 is a part vertical cross-sectional view illustrating a fifth example of an embodiment of the present invention.
Figure 12:
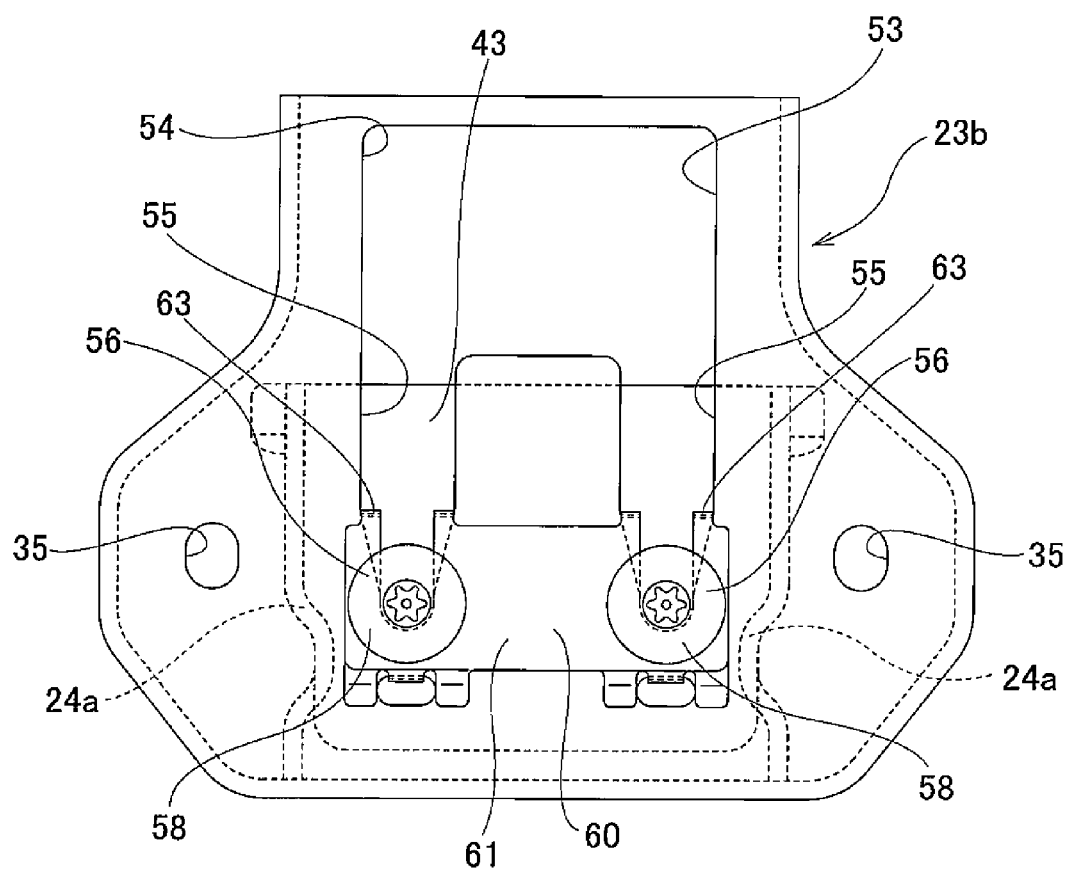
FIG. 12 is a top view of the major parts of the left end section in FIG. 11.

FIG. 11 and FIG. 12 illustrate a fifth example of an embodiment of the present invention. In this example, a long through hole 53 in forward-backward direction, which is the locking section with material removed, is formed in the middle section in the width direction of the vehicle-side bracket 23b. This through hole 53 is composed of a wide section 54 in one location, and a pair of extending sections 55. The wide section 54 forms the front half section of the through hole 53, and is formed in the center section in the width direction of the vehicle-side bracket 23b up to the front end section of the vehicle-side bracket 23b. The pair of extending sections 55 form the rear half section of the through hole 53, and extend further toward the rear from two locations on both sides in the width direction of the rear end edge of the wide section 54, the extending sections being parallel with each other and long in the forward-backward direction, and forming notches.

The top plate section 43a of the column-side bracket 22a is supported on the bottom side of the vehicle-side bracket 23b by a pair of bolts 56 and a pair of nuts 57, which are locking members, so as to be able to break away in the forward direction during a secondary collision. These bolts 56 are such that there is a head section 58 provided on the top end section, and a screw rod section 59 provided from the middle section to the bottom end section. Of these, the outer diameter of the head section 58 is larger than the width dimension of the extending sections 55, and the outer diameter of the screw rod section 59 is less than the width dimension of the extending sections 55. The column-side bracket 22a and the vehicle-side bracket 23b are connected and supported by the bolts 56 and nuts 57 by way of a sliding member 60.

The sliding member 60 is obtained by bending a plate material that slides easily such as metal plate that is coated on the surface with a synthetic resin such as polyamide resin, PTFE or the like, and is composed of one top-side sliding plate section 61 and two bottom-side sliding plate sections 62 that are connected by connecting sections 63 at two locations on both end sections in the width direction. The top-side sliding plate section 61 is such that the dimension in the width direction of the vehicle-side bracket 23b is larger than the width dimension of the wide section 54. Moreover, the width dimension of the bottom-side sliding plate sections is larger than the width dimension of the extending sections 55. Furthermore, the width dimension of the connecting sections 63 is a little smaller than the width dimension of the extending sections 55.

The sliding member 60 is such that the top-side sliding plate section 61 is located on the top surface of the vehicle-side bracket 23b in the rear-end portion of the extending sections 55, and the bottom-side sliding plate sections 62 are located on the bottom surface of the vehicle-side bracket 23b in the rear-end portion of the extending sections 55, and the connecting sections 63 are located in the middle sections in the forward-backward direction of the inside of the extending sections 55. The screw rod sections 59 of the bolts 56 are inserted from above through the through holes that are formed in both end sections of the top-side sliding plate section 61, and furthermore, the screw rod sections 59 are inserted from above through the through holes that are formed in the rear-end sections of the extending sections 55 and the bottom-side sliding plate sections 62, and screwed into nuts 57 that are fastened to the through holes in the top plate section 43a and further tightened. In this state, the portions of the edges on both sides of the extending sections 55 of the through hole 53 of the vehicle-side bracket 23b are held on the top surface and bottom surface by way of the sliding member 60. The column-side bracket 22a is connected to and supported by the vehicle-side bracket 23b so as to be able to break away in the forward direction due to an impact load that is applied during a secondary collision.

In this example, the column-side bracket 22a and the vehicle-side bracket 23b are supported at two locations in the width direction of the portion between the installation holes 35 that are provided for supporting and fastening the vehicle-side bracket 23b to the vehicle. Therefore, the support rigidity against torque in the direction of rotation of the steering column 6b that occurs due to operation of the steering wheel 1 and is amplified by an electric motor 15 can be increased compared with the case when supported at only one location in the width direction. The construction and functions of other parts are the same as in the first or second examples.

SIXTH EXAMPLE

Figure 13:
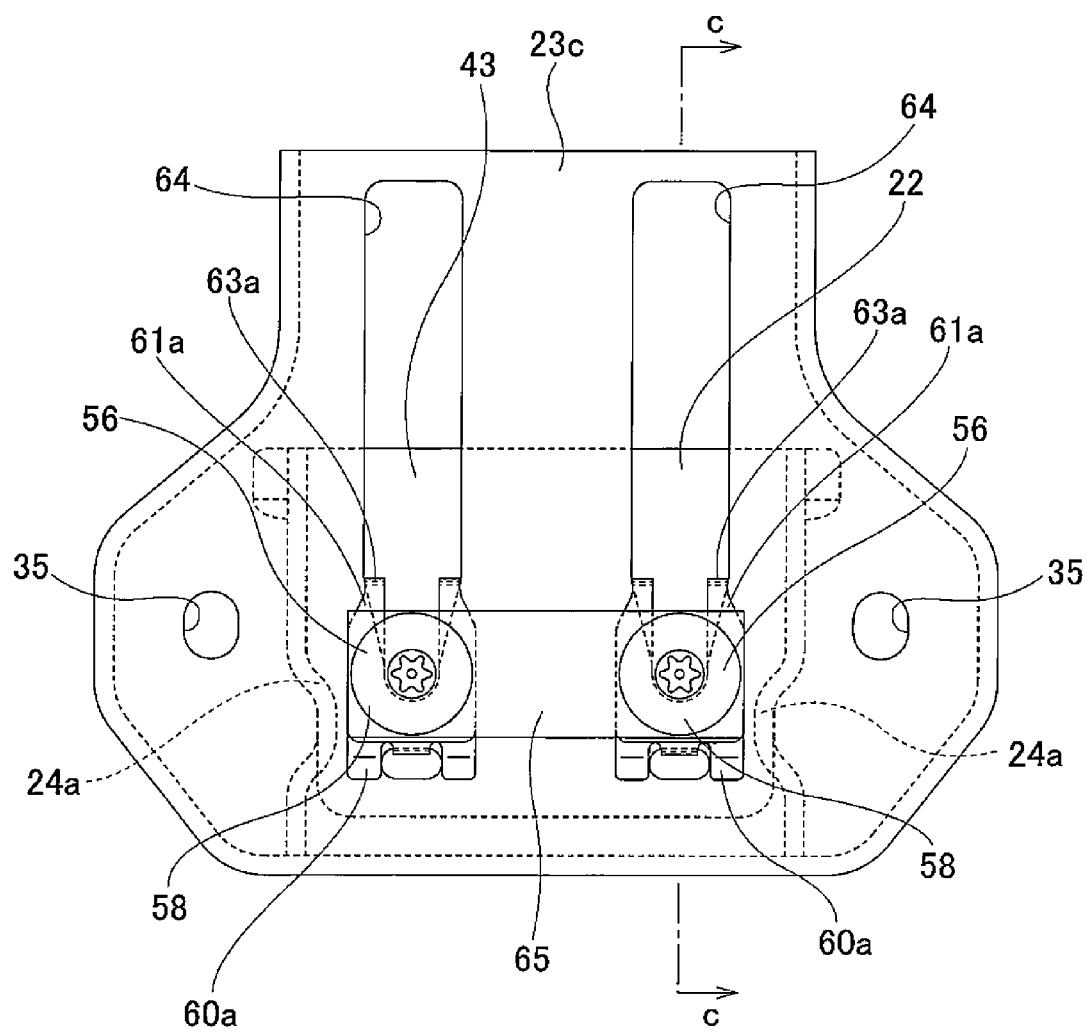
FIG. 13 is a top view illustrating the major parts of a sixth example of an embodiment of the present invention.
Figure 14:
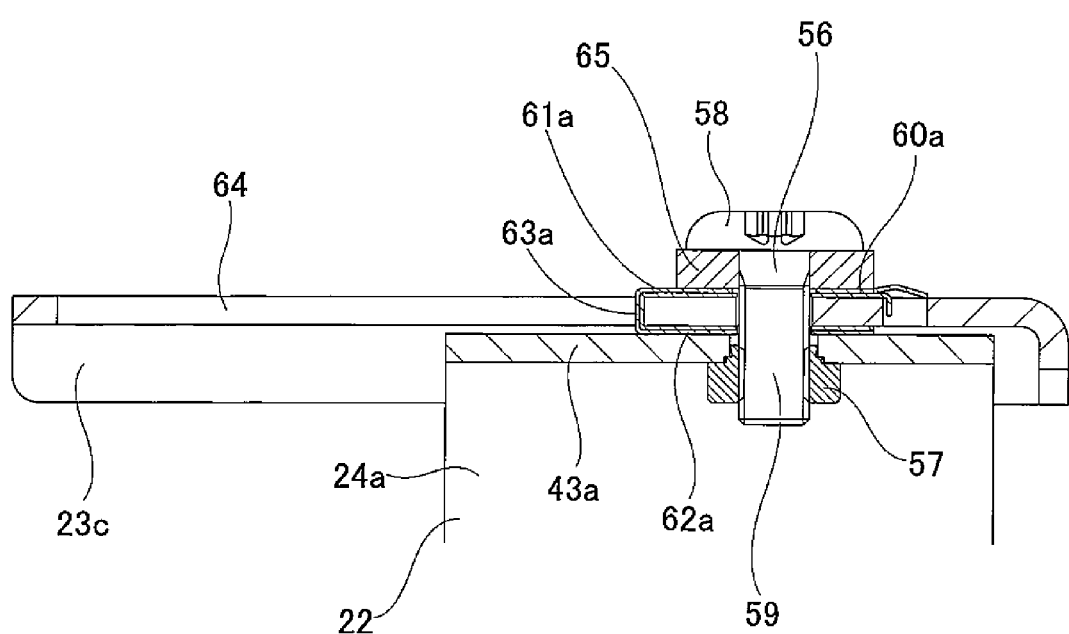
FIG. 14 is a cross-sectional view of section c-c in FIG. 13.
Figure 15:
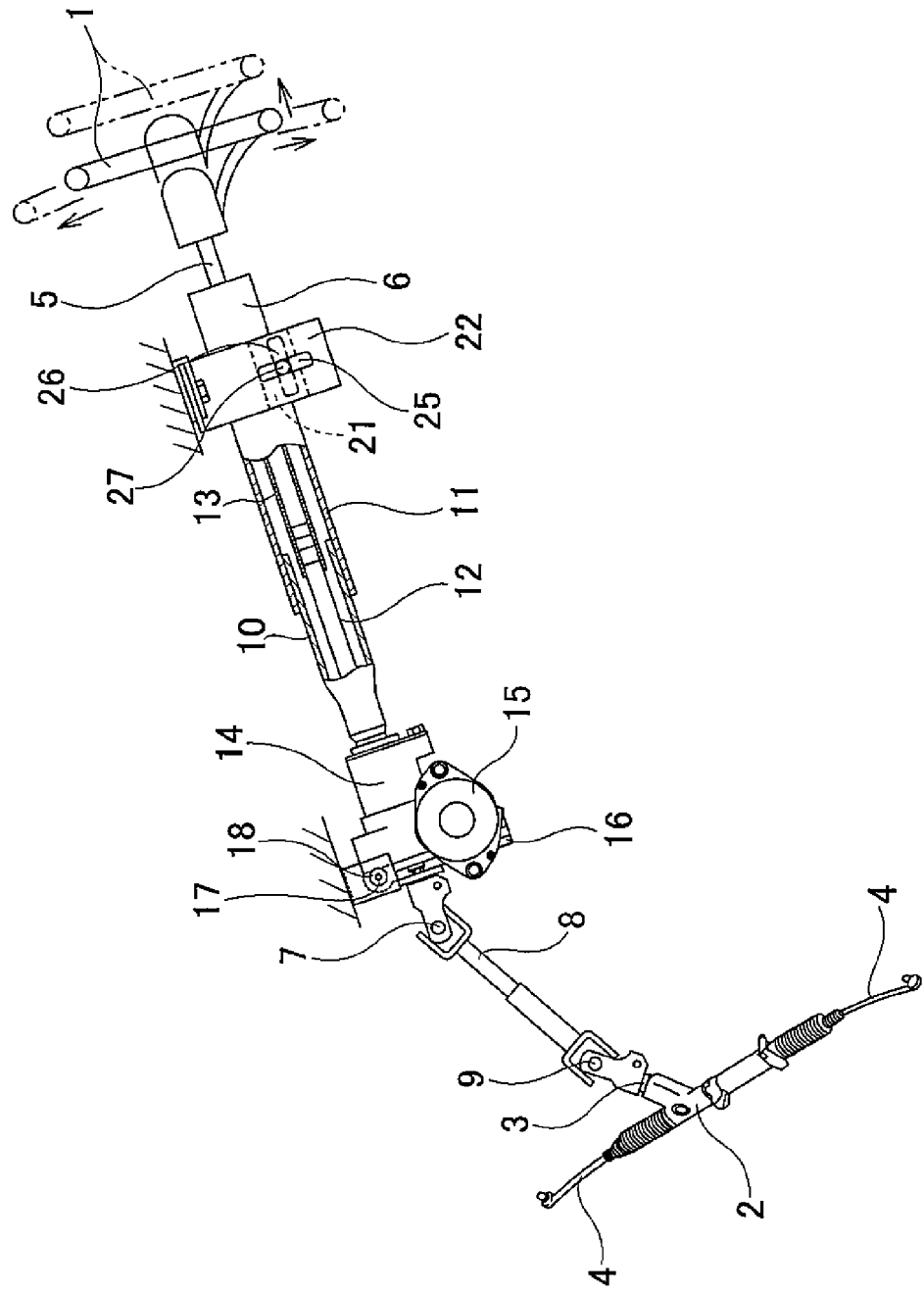
FIG. 15 is a partial cross-sectional view illustrating an example of a conventional steering apparatus.

FIG. 13 and FIG. 14 illustrate a sixth example of an embodiment of the present invention. In this example, a pair of through holes 64 that are long and parallel with each other in the forward-backward direction, and which function as locking sections with material removed, are formed at two locations on both sides of the center section in the width direction of the middle section in the width direction of the vehicle-side bracket 23c. A pair of bolts 56 that are inserted though the rear-end portions of these through holes 64, nuts 57 that screw onto the male screw sections of these bolts 56, and sliding members 60a connect and support the column-side bracket 22a with respect to the vehicle-side bracket 23c such that the column-side bracket 22a can break away in the forward direction due to an impact load that is applied during a secondary collision. Each sliding member 60a is constructed such that a top-side sliding plate section 61a and a bottom-side sliding plate section 62a that have a width dimension that is larger than the width dimension of the through hole 64, that are connected by a connection section 63a that has a width dimension that is less than the width dimension of the through holes 64. Furthermore, in this example, a rectangular shaped reinforcement plate 65 is provided on the top side of the sliding members 60a, and is spaned between these sliding members 60a. The top surface of both end sections of the reinforcement plate 65 is pressed by the bottom surfaces of the head sections 58 of the bolts 56 against the top surface of the vehicle-side bracket 23c by way of the top-side sliding plate sections 61a of the sliding members 60a.

In the case of the construction of this example, tuning for making the friction state between the bottom surface of the head sections 58 of the bolts 56 and the top surface of the vehicle-side bracket 23c uniform on both the left and right is easier. The construction and functions of the other parts are mostly the same as in the fifth example of the embodiment.

When embodying the present invention, the combination of the locking member and the locking section with material removed is not limited to that of the examples of an embodiment above. In other words, a locking capsule such as illustrated in the first example or the second example of the embodiment can be constructed so as to lock in a through hole in the vehicle-side bracket that is not open on the front end section. Moreover, the bolts such as illustrated in the fifth example or the sixth example can be constructed so as to lock in a locking notch in the vehicle-side bracket that is open on the front end section.

Furthermore, in order to lower the rigidity of the support plate sections of the column-side bracket in order to make it possible to easily adjust the position of the steering wheel, and keep the force for holding the steering wheel in the adjusted position low, with respect to the construction illustrated in FIG. 9 and FIG. 10, it is possible to alternatively or additionally make the thickness of one of the pair of support plate sections thin. In that case, the support rigidity of the steering column with respect to the column-side bracket is maintained by maintaining the thickness of the other support plate section.

INDUSTRIAL APPLICABILITY

The present invention can be widely applied to support construction of a steering column of a steering apparatus that supports a steering wheel, and that is supported by the vehicle side so as to be able to break away in the forward direction during a secondary collision. Particularly, the present invention is preferably applied to construction in which members such as an electric motor of an electric power-steering apparatus, a reducer, a controller and the like are installed on the front end section of the steering column.

Moreover, the present invention is preferably applied to construction that comprises both a tilt mechanism and a telescopic mechanism, however, the invention can also be applied to a steering apparatus that comprises only a tile mechanism and does not comprise a telescopic mechanism.

EXPLANATION OF THE REFERENCE NUMBERS

1 Steering wheel
2 Steering gear unit
3 Input shaft
4 Tie rod
5, 5a Steering shaft
6, 6a, 6b Steering column
7 Universal joint
8 Intermediate shaft
9 Universal joint
10 Inner column
11, 11a, 11b, 11c Outer column
12 Inner shaft
13 Outer shaft
14 Housing
15 Electric motor
16 Controller
17 Support cylinder
18 Horizontal shaft
19 Slit
20 Through hole in the circumferential direction
21, 21a, 21b Supported plate section
22, 22a Column-side bracket
23, 23a, 23b, 23c Vehicle-side bracket
24, 24a Support plate section
25 Long hole in the up-down direction
26 Long hole in the forward-backward direction
27 Adjustment rod
28 Head section
29, 29a Nut
30 Driving-side cam
31 Driven-side cam
32 Cam apparatus
33 Adjustment lever
34, 34a, 34b Locking notch
35 Installation hole
36, 36a, 36b Locking capsule
37 Flange section
38a, 38b Small through hole
39, 39a Locking pin
40, 40a Bolt
41, 41a Nut
42 Rivet
43, 43a Top plate section
44, 44a Base plate section
45, 45a Bent section
46 Through hole
47 Weld
48 Notch
49 Elastic pressure plate section
50 Protruding section
51 Slit
52 Displacement-side bracket
53 Through hole
54 Wide section
55 Extending section
56 Bolt
57 Nut
58 Head section
59 Screw rod section
60, 60a Sliding member
61, 61a Top-side sliding plate section
62, 62a Bottom-side sliding plate section
63, 63a Connecting section
64 Through hole
65 Reinforcement plate
66 Engagement groove
67 Through hole in the up-down direction

What is claimed is:

1. A steering column support construction, comprising:
a displacement-side bracket that is fastened to a top side portion of a middle section of a steering column;
a vehicle-side bracket that has a locking section with material removed that is formed in a middle section in a width direction thereof, that is fastened to a vehicle body side in at least two locations on both sides in the width direction of the locking section with material removed, and is not displaced forward even during a secondary collision;
a column-side bracket having a pair of left and right support plate sections that are located on both sides of the displacement-side bracket;
a locking member that together with being fastened to the column-side bracket, engages with the locking section with material removed;
an adjustment rod that, with the displacement-side bracket held between the support plate sections, is inserted in the width direction through the displacement-side bracket and is spanned between the support plate sections; and
a pair of pressure sections that are provided on both end sections of the adjustment rod; and
fastening and adjustment of the displacement bracket with respect to the column-side bracket being enabled by expanding or contracting a space between the pressure sections, and the column-side bracket and locking member being supported with respect to the vehicle-side bracket so as to be able to break away in a forward direction thereof due to an impact load caused by the secondary collision;
wherein the locking section with material removed is constructed by a locking notch or a through hole that extends in the forward-backward direction, and that is formed in a center section in the width direction of the vehicle-side bracket, and the locking member is composed of a locking capsule that is fastened to the column-side bracket
wherein the column-side bracket comprises a top plate section that connects edges on top ends of the support plate sections, and the locking capsule, together with comprising a flange section on both end sections in the width direction, is supported by and fastened to a top surface of the top plate section, and edge portions on both sides of the locking notch or the through holes of the vehicle-side bracket are locked between a bottom surface of the flange section and the top surface of the top plate section.

2. The steering column support construction according to claim 1, wherein when seen from the width direction, edges on bottom ends of the support plate sections of the column-side bracket do not protrude downward from a portion on a bottom side of a middle section of the steering column.

3. The steering column support construction according to claim 1, wherein the locking section with material removed is constructed by a locking notch or a through hole that extends in the forward-backward direction; the locking member is composed of a bolt comprising a head section that is located on a top end section thereof and has a diameter that is larger than a width dimension of the locking notch or the through hole, and a male screw section that is provided on a bottom end section thereof; and the column-side bracket comprises a top plate section that connects edges on top ends of the support plate sections; and by the male screw section of the bolt screwing into a nut that is fastened to the top plate section or into a screw hole that is formed in the top plate section and tightened, portions on both sides of the locking notch or the through hole of the vehicle-side bracket are locked between a bottom surface of the head section of the bolt and the top surface of the top plate section.

4. A steering column support construction, comprising:
a displacement-side bracket that is fastened to a top side portion of a middle section of a steering column;
a vehicle-side bracket that has a locking section with material removed that is formed in a middle section in a width direction thereof that is fastened to a vehicle body side in at least two locations on both sides in the width direction of the locking section with material removed, and is not displaced forward even during a secondary collision;
a column-side bracket having a pair of left and right support plate sections that are located on both sides of the displacement-side bracket;
a locking member that together with being fastened to the column-side bracket, engages with the locking section with material removed;
an adjustment rod that, with the displacement-side bracket held between the support plate sections, is inserted in the width direction through the displacement-side bracket and is spanned between the support plate sections, and
a pair of pressure sections that are provided on both end sections of the adjustment rod; and
fastening and adjustment of the displacement bracket with respect to the column-side bracket being enabled by expanding or contracting a space between the pressure sections, and the column-side bracket and locking member being supported with respect to the vehicle-side bracket so as to be able to break away in a forward direction thereof due to an impact load caused by the secondary collision;
wherein the locking section with material removed is constructed by a locking notch or a through hole that extends in the forward-backward direction; the locking member is composed of a bolt comprising a head section that is located on a top end section thereof and has a diameter that is larger than a width dimension of the locking notch or the through hole, and a male screw section that is provided on a bottom end section thereof; and the column-side bracket comprises a top plate section that connects edges on top ends of the support plate sections, and by the male screw section of the bolt screwing into a nut that is fastened to the top plate section or into a screw hole that is formed in the top plate section and tightened, portions on both sides of the locking notch or the through hole of the vehicle-side bracket are locked between a bottom surface of the head section of the bolt and the top surface of the top plate section;
further comprising a sliding member that comprises a pair of top and bottom sliding plates, and a connecting section that has a width dimension that is less than the width dimension of the locking section with material removed and that is integrally connected with the sliding plates, wherein the sliding plates are respectively held between the bottom surface of the head section and a top surface of the vehicle-side bracket, and between a bottom surface of the vehicle-side bracket and the top surface of the top plate sections.

5. The steering column support construction according to claim 4, wherein the locking section with material removed is constructed by a through hole that comprises a wide section in a front half section thereof, and two extending sections in a rear half section thereof that are notches and extend further backward from two locations on both end sections in the width direction of a rear end edge of the wide section, and parallel with each other in the forward-backward direction, and the sliding member and the bolts are located in rear end sections of these extending sections.

6. The steering column support construction according to claim 4, wherein the locking section with material removed is composed of a pair of through holes that extend in the forward-backward direction and parallel with each other, and the sliding member and the bolts are located in rear end sections of these through holes.

7. The steering column support construction according to claim 5, wherein a reinforcement plate is provided on a top side of the sliding members that are located at the rear end sections of extending sections or the through holes so as to be spanned between the sliding members, and top surfaces of both end sections of the reinforcement plate are pressed against the top surface of the vehicle-side bracket by the bottom surface of the head sections of the bolts.

8. The steering column support construction according to claim 1, wherein a portion of at least one of the support plate sections where the adjustment rod is inserted has rigidity in the width direction that is lower than that of the other portions.

9. The steering column support construction according to claim 8, wherein a slit is formed in a portion of the at least one of the support plate sections which is adjacent to a through hole that is formed in the support plate section for inserting the adjustment rod.

10. The steering column support construction according to claim 8, wherein the column-side bracket comprises a top plate section that connects part of edges on top ends of the support plate sections, and a portion of the at least one of the support plate sections where a through hole is formed for inserting the adjustment rod protrudes in the forward-backward direction more than a connecting section between the column-side bracket with the locking member and the vehicle-side bracket; and an edge on a top ends of the protruding portion is not connected to the top plate section.

11. The steering column support construction according to claim 8, wherein a thickness of the one supporting plate section is less than the thickness of the other supporting plate section.

* * * * *